United States Patent [19]

Yokota et al.

[11] Patent Number: 5,070,173

[45] Date of Patent: * Dec. 3, 1991

[54] THERMOPLASTIC POLYURETHANE

[75] Inventors: Masahisa Yokota, Nobeoka; Atsushi Shimizu, Yokohama; Kyosuke Komiya, Kurashiki; Kazunori Yamataka, Yokohama; Tadanori Nomura, Nobeoka, all of Japan

[73] Assignee: Asahi Kasei Kogyo Kabushiki Kaisha, Osaka, Japan

[*] Notice: The portion of the term of this patent subsequent to Aug. 8, 2006 has been disclaimed.

[21] Appl. No.: 392,154

[22] Filed: Aug. 10, 1989

Related U.S. Application Data

[62] Division of Ser. No. 227,818, Aug. 3, 1988, Pat. No. 4,855,377.

[30] Foreign Application Priority Data

Aug. 4, 1987 [JP] Japan .................................. 62-193769
Sep. 21, 1987 [JP] Japan .................................. 62-236728

[51] Int. Cl.$^5$ ............................................. C08G 18/44
[52] U.S. Cl. ...................................................... 528/85
[58] Field of Search ............................ 528/85, 80, 25

[56] References Cited

U.S. PATENT DOCUMENTS

| 3,639,354 | 2/1972 | Müller et al. | 260/77.5 |
|---|---|---|---|
| 4,013,702 | 3/1977 | Cartier | 260/463 |
| 4,101,529 | 7/1978 | Ammons | 528/67 |
| 4,103,070 | 7/1978 | Ammons | 428/412 |
| 4,105,641 | 8/1978 | Buysch | 526/712 |
| 4,129,715 | 12/1978 | Chen | 528/67 |
| 4,201,720 | 5/1980 | Passagne | 260/463 |
| 4,362,825 | 12/1982 | Grabhoefer | 521/172 |
| 4,374,935 | 2/1983 | Decker | 521/173 |
| 4,855,377 | 8/1989 | Yokota et al. | 528/25 |

FOREIGN PATENT DOCUMENTS 50-156599 12/1975 Japan .
60-195117 10/1985 Japan .
64-9225 1/1989 Japan .

Primary Examiner—John Kight, III
Assistant Examiner—Shelley A. Wright
Attorney, Agent, or Firm—Berman & Aisenberg

[57] ABSTRACT

A novel copolycarbonate is provided, which comprises recurring units respectively of the formulae:

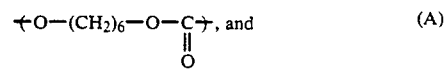

(A)

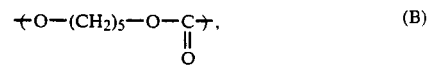

(B)

in a molar ratio of units (A) to units (B) of from 9:1 to 1:9. The copolycarbonate has a number average molecular weight of from 300 to 50,000. The copolycarbonate is useful as a reactive polymer for producing final polymers such as a polyurethane and a thermoplastic elastomer. The copolycarbonate as well as various final polymers produced therefrom have excellent resistance to hydrolysis, light, chlorine, oxidative degradation, heat, etc. The polyurethane and the thermoplastic elastomer containing units of the novel copolycarbonate as soft segments exhibit remarkably improved flexibility and elastic recovery as compared to those of the conventional polymers.

7 Claims, 1 Drawing Sheet

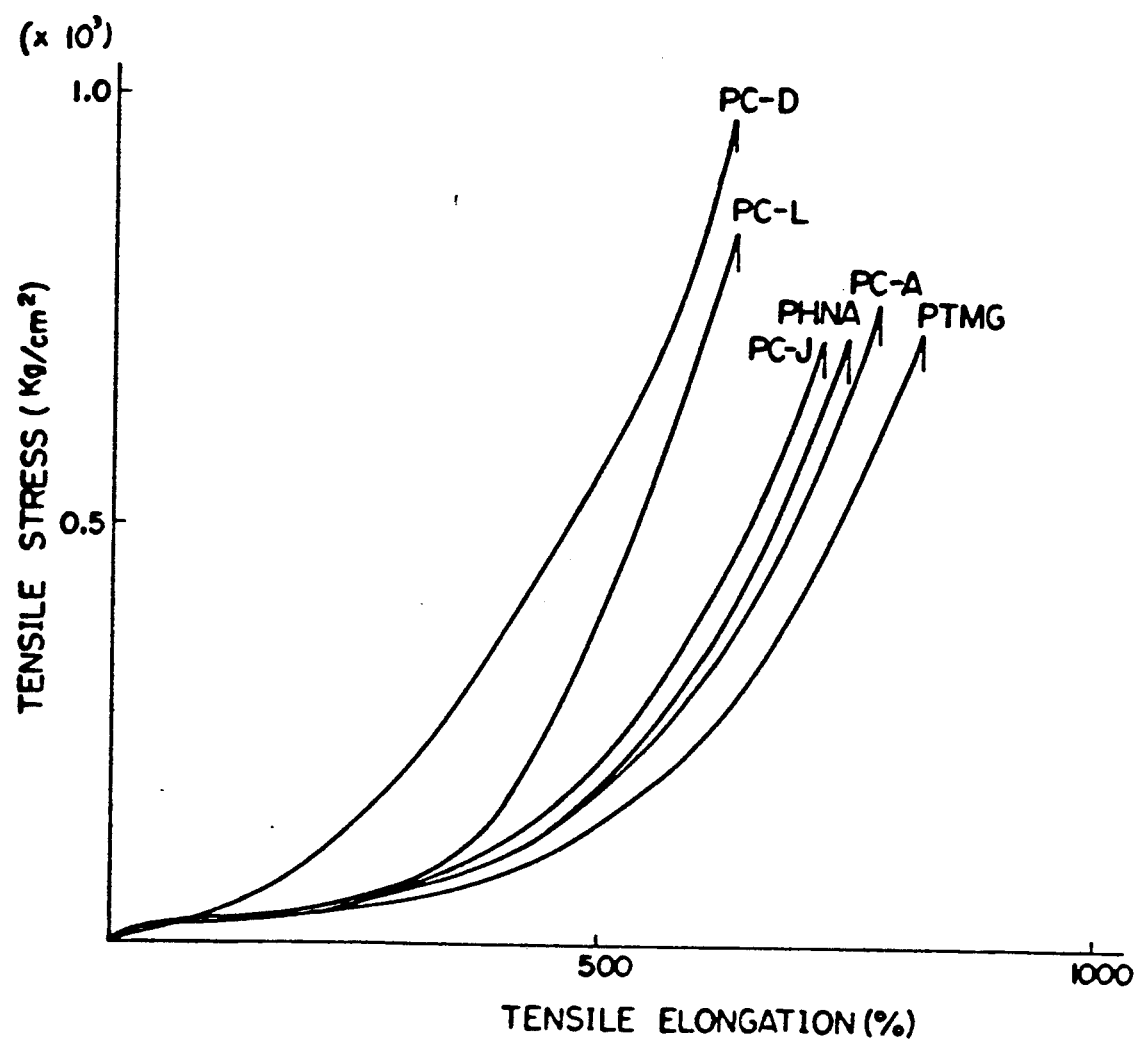

THERMOPLASTIC POLYURETHANE

RELATED APPLICATION

This application is a division of application Ser. No. 227,818, filed on Aug. 3, 1988, and now U.S. Pat. No. 4,855,377.

BACKGROUND OF THE INVENTION

1. Field of the Invention

The present invention relates to a copolycarbonate. More particularly, the present invention is concerned with a novel copolycarbonate comprising 1,6-hexanediol and 1,5-pentanediol units in specific molar ratios. The present invention is also concerned with the use of the above-mentioned copolycarbonate as a novel structural component for polymers, such as a polyurethane and thermoplastic elastomers. The copolycarbonate of the present invention and polymers derived therefrom have excellent resistance to hydrolysis, light, chlorine, oxidative degradation, heat, etc.

2. Discussion of Related Art

A polyurethane and a urethane-, ester- or amide-based thermoplastic elastomer are widely used in the art. The soft segments of the polyurethane and thermoplastic elastomer are generally composed of structural units derived from a polyester polyol and/or a polyether polyol both having a hydroxyl group at each of the molecular terminals thereof. In this connection, reference is made to U.S. Pat. Nos. 4,362,825, 4,374,935 and 4,129,715.

A polyester polyol, such as a polyadipate polyol, is poor in hydrolysis resistance. Accordingly, for example, a polyurethane comprising, as soft segments, structural units derived from a polyester-polyol has a disadvantage in that cracks are likely to occur and mold is likely to grow on the surface of the polyurethane within a relatively short period of time.

On the other hand, a polyurethane comprising structural units derived from a polyether polyol has desirable hydrolysis resistance. However, the polyurethane has a disadvantage in that it is poor in resistance to light, oxidative degradation and chlorine.

The above-mentioned disadvantages of the polyurethane are attributed to the presence of ester groups and to the presence of ether groups, respectively, in the polymer chain.

As in the field of a polyurethane, improvement of a polyester- or polyamide-based thermoplastic elastomer in resistance to heat, light, hydrolysis, mildewing and oil has recently been strongly desired in the art.

On the other hand, a sealant comprising an aliphatic polyether or polyetherester having a methyldiacetoxysilyl group at each of the molecular terminals thereof is known in the art, as disclosed, for example, in Japanese Patent Application Laid-Open Specification No. 50-15699. Such a sealant has, however, a disadvantage in that it is poor in resistance to light, oxidative degradation and chlorine due to the presence of ether groups in the polymer used as the component for the sealant.

A polycarbonate polyol prepared from 1,6-hexanediol is being marketed as a material for providing soft segments which have desirable resistance to hydrolysis, light, oxidative degradation, heat and chlorine. This resistance is believed to be due to the fact that the carbonate bond of the polymer chain has excellent chemical stability.

However, a polyurethane and a polyester-based elastomer, each comprising structural units derived from a polycarbonate polyol having 1,6-hexanediol residues, disadvantageously exhibit extremely poor flexibility and elastic recovery, as compared to those of a polymer comprising structural units derived from other polyols, such as a polyether polyol. Further, as shown in Comparative Example 13, it is difficult to produce a fiber from the polyurethane because of the poor spinnability of the polymer.

To alleviate these problems, various proposals have been made. For example, it was proposed in U.S. Pat. No. 3,639,354 and European Patent No. 135848 to use, as a polyol component, a polycarbonate prepared from a mixture of 1,6-hexanediol and a diol having an ether group, which is effective for lowering to some extent the softening temperature of the final polyurethane. Such introduction of ether groups is useful for providing a polyurethane which has improved flexibility, but such a polyurethane is disadvantageously poor in resistance to light, chlorine and oxidative degradation.

In U.S. Pat. Nos. 4,103,070 and 4,101,529, it was proposed to use, as a polyol component, a polycarbonate diol synthesized from a mixture of 1,6-hexanediol and 1,4-cyclohexanedimethanol. In the patents, it is disclosed that the use of the polycarbonate diol will yield an amorphous polyurethane. While the crystallinity of the final polyurethane can be lowered, the cyclic ring introduced into the polyurethane imparts increased hardness to the polyurethane. Consequently, with respect to the polyurethane, flexibility improvement is not satisfactory.

In Japanese Patent Application Laid-Open Specification No. 60-195117, it was proposed to use, as a polyol component, a polycarbonate diol synthesized from a mixture of 3-methyl-1,5-pentanediol, 1,6-hexanediol and 1,9-nonanediol. In the Laid-Open specification, it is disclosed that the final polymer exhibits improved flexibility. While the crystallinity of the polymer is lowered by the incorporation of side chains, the side chains also cause the polymer to exhibit poor resistance to light and oxidative degradation. In the Laid-Open specification, the use of 3-methyl-1,5-pentanediol is limited to at most 50% by weight when high resistance is required to heat, light and oxidative degradation.

In U.S. Pat. Nos. 4,013,702 and 4,105,641, the synthesis of a copolycarbonate from a mixture of 1,6-hexanediol and 1,4-butanediol is described. These patents relate to a method for synthesizing a copolycarbonate. In the patents, there is no description relating to the properties of the copolycarbonate. But, according to tests (as shown in Comparative Example 14), the elastic recovery of the final polymer is not sufficient, and when production of polyurethane fiber is desired, spinning is difficult due to the poor spinnability of the polymer. Moreover, it is noted that (as shown in Comparative Example 11) the elastic recovery is not sufficient with respect to a copolycarbonate synthesized from a mixture of 1,6-hexanediol and 1,9-nonanediol.

As apparent from the foregoing, all of the copolycarbonates known in the art have some inherent problems, which limit their applications.

SUMMARY OF THE INVENTION

The present inventors have conducted extensive and intensive studies with a view toward developing a copolycarbonate and a polymer comprising structural units derived therefrom which have excellent resistance to hydrolysis, light, chlorine, oxidative degradation, heat, etc. As a result of these studies, it has unexpectedly been found that a copolycarbonate comprising recurring units, respectively, of 1,6-hexanediol and 1,5-pentanediol residues in specific molar ratios has desired properties and that the copolycarbonate is useful for providing final polymers, such as a polyurethane and a thermoplastic elastomer, having desired properties. Moreover, it has surprisingly been found that a polyurethane or thermoplastic elastomer comprising structural units derived from the copolycarbonate described above exhibits remarkably improved flexibility and elastic recovery as compared to those of the conventional polymers prepared from a 1,6-hexanediol-based polycarbonate polyol. It has further been found that a fiber can be readily produced from such a polyurethane or thermoplastic elastomer due to the excellent spinnability thereof. The present invention has been completed on the basis of these novel findings.

Accordingly, it is an object of the present invention to provide a novel copolycarbonate which has excellent resistance to hydrolysis, light, chlorine, oxidative degradation, heat, etc.

It is another object of the present invention to provide a novel polymer, such as a polyurethane and a thermoplastic elastomer, comprising structural units derived from the copolycarbonate of the above type, which polymer exhibits not only excellent resistance to hydrolysis, light, chlorine, oxidative degradation, etc., but also improved flexibility and elastic recovery.

It is a further object of the present invention to provide a novel effective process for producing the above-mentioned copolycarbonate.

The foregoing and other objects, features and advantages of the present invention will be apparent from the following detailed description and appended claims taken in connection with the accompanying drawing.

BRIEF DESCRIPTION OF THE DRAWING

The FIGURE is a graph showing the relationships between the tensile stress and the tensile elongation of the polyurethanes containing the copolycarbonates of the present invention and some comparative polyurethanes, as described in Examples 27 and 28 and Comparative Examples 13 to 16.

DETAILED DESCRIPTION OF THE INVENTION

In one aspect of the present invention, there is provided a copolycarbonate comprising recurring units, respectively, of the formulae:

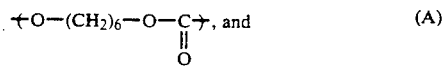

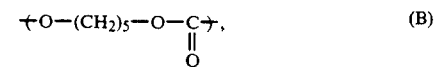

and terminal groups, the molar ratio of units (A) to units (B) being in the range of from 9:1 to 1:9, the copolycarbonate having a number average molecular weight of from 300 to 50,000.

In the copolycarbonate of the present invention, it is necessary that the molar ratio of units (A) to units (B) be in the range of from 9:1 to 1:9. When the molar ratio is outside this range, the final copolycarbonate polymer, for example, a polyurethane, exhibits poor elastic recovery, flexibility and spinnability. It is really surprising that a polyurethane comprising structural units derived from the above-defined copolycarbonate, having a specific molar ratio of units (A) to units (B), is not only chemically stable but also exhibits improved elastic recovery, flexibility and spinnability as compared to the polyurethanes prepared from the conventional polycarbonate. The molar ratio of units (A) to units (B) may be determined by $C^{13}$ NMR.

The copolycarbonate according to the present invention may further comprise at least one third component selected from residues of compounds having at least two hydroxyl groups per molecule as long as the third component does not adversely affect the property improvements to be attained by the present invention.

The maximum amount of the third component depends on the type of compound. For example, when 1,6-hexanediol and 1,5-pentanediol residues are present in equimolar amounts, 1,4-butanediol residues (as a third component of the copolycarbonate) may be present in an amount of 20 mole % or less, preferably 15 mole % or less, based on the total of the 1,6-hexanediol and 1,5-pentanediol residues.

In the present invention, the copolycarbonate may be a polyfunctional copolycarbonate in which the third component is comprised of residue of a compound having at least three hydroxyl groups per molecule, such as trimethylolethane, trimethylolpropane, hexanetriol or pentaerythritol. When the amount of residue of a compound having at least three hydroxyl groups is too large, crosslinking and gelation are likely to occur. Therefore, it is preferred that the amount does not exceed 10 mole %, based on the total of the diol components of the copolycarbonate.

The copolycarbonate according to the present invention is a viscous liquid at about 25° C. When a copolycarbonate, which is amorphous and has not any melting point (measurable with a differential scanning calorimeter), is used for preparing a polyurethane, the resultant polyurethane exhibits excellent elastic recovery, flexibility and spinnability. With respect to using a differential scanning calorimeter, reference is made to M.J.O. Neill, Anal. Chem., 36 (7), 1238 (1964) and R. A. W. Hill, R. P. Slessor, Trans, Farady Soc., 65 (2), 340 (1969). If the structural units of a copolycarbonate are comprised only of the units (A) and (B), the copolycarbonate is amorphous when the molar proportion of units (A) to units (B) is in the range of from 7.5:2.5 to 1.5:8.5. Therefore, it is preferred that the molar ratio of units (A) to units (B) be in this range. On the other hand, if a third component is incorporated in the copolycarbonate in an amount which does not adversely affect the improvement in properties attained by the present invention, the copolycarbonate is amorphous when the molar ratio of units (A) to units (B) is in the range of from 9:1 to 1:9.

The appropriate range of molecular weight of the copolycarbonate according to the present invention depends on the use of the final polymer. However, generally, the copolycarbonate has a number average molecular weight of from 300 to 50,000. The molecular weight is generally measured by a conventional gel permeation chromatography method or a conventional terminal group determination method. It is preferred that the number average molecular weight be in the range of from 600 to 20,000.

Each of the terminal groups of the copolycarbonate of the present invention is a member selected from the group consisting of a hydroxyl group, a carboxyl group, an acryloyl group, a methacryloyl group, an allyl group, an alkyl carbonate group having 2 to 11 carbon atoms, an aryl carbonate group having 7 to 11 carbon atoms, and a substituted silyl group of the formula

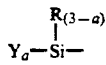

wherein R is a hydrogen atom or a monovalent hydrocarbon residue having 1 to 10 carbon atoms, each Y is independently a member selected from the group consisting of a halogen atom, an alkoxy group having 1 to 10 carbon atoms, a phenoxy group, an acyloxy group having 1 to 11 carbon atoms, an aminoxy group, a thioalkoxy group having 1 to 10 carbon atoms and an amino group, and a is a number having an average value of 1 to 3. The types of terminal groups may be chosen according to the use of the final polymer. For example, when the copolycarbonate is used for preparing a polyurethane, it is necessary that substantially all of the terminal group of the copolycarbonate be hydroxyl groups. On the other hand, when the copolycarbonate is used for preparing a polyester-based elastomer, a carbonate-based elastomer or a polymeric plasticizer, each of the terminal groups of the copolycarbonate may be a hydroxyl group, an alkyl carbonate group, an aryl carbonate group, a carboxyl group or an ester group. Further, when the copolycarbonate is used for preparing a polyamide-based elastomer, it is necessary that substantially all of the terminal groups of the copolycarbonate be carboxyl groups. Still further, when the copolycarbonate is used for preparing a photopolymerizable resin, a coating material or an optical material, it is necessary that substantially all of the terminal groups of the copolycarbonate be allyl or (meth)acryloyl groups. Still further, when the copolycarbonate is used for preparing a sealant, it is necessary that at least one of the terminal groups of the copolycarbonate be a substituted silyl group of the formula

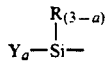

wherein R is a hydrogen atom or a monovalent hydrocarbon residue having 1 to 10 carbon atoms, each Y is independently a member selected from the group consisting of a halogen atom, an alkoxy group having 1 to 10 carbon atoms, a phenoxy group, an acyloxy group having 1 to 11 carbon atoms, an aminoxy group, a thioalkoxy group having 1 to 10 carbon atoms and an amino group, and a is a number having an average value of 1 to 3, the silyl group being reactive at room temperature. Moreover, the copolycarbonate according to the present invention may have a terminal group selected from an amino group, an aminoalkyl group, a glycidyl ether group, a caanoethyl group, an isocyanate group and other functional groups.

The copolycarbonate of the present invention can generally be synthesized from a mixture comprising 1,6-hexanediol and 1,5-pentanediol or a mixture comprising 1,6-hexanediol and 1,5-pentanediol as major components and other aliphatic diol or diols or aliphatic polyol or polyols as minor components in accordance with various known methods as described in Schnell: Polymer Reviews, vol. 9, pp 9-20.

Now, with respect to representative examples of the copolycarbonate of the present invention and the final polymers, such as a polyurethane and a thermoplastic elastomer, comprising structural units derived from the copolycarbonate, particular descriptions will now be made.

The copolycarbonate having hydroxyl groups at its terminals according to the present invention is a novel polymer, and representative examples of such copolycarbonates are represented by the formula:

wherein each $R^1$ in the majority of the recurring units is independently an aliphatic glycol residue selected from 1,5-pentanediol and 1,6-hexanediol residues, both of which are concurrently present, and n is a number having an average value of from 2 to 200, preferably from 4 to 100.

The above copolycarbonate may be synthesized by performing ester exchange between a dialkyl carbonate and a mixture of aliphatic hydroxyl compounds, e.g., a mixture comprising 1,5-pentanediol and 1,6-hexanediol as major components and, optionally, other aliphatic glycols as minor components, in the presence of a catalyst customarily employed for ester exchange reaction. This process for synthesizing the copolycarbonate is described in Schnell: Polymer Reviews, vol. 9, pp 9-20. In connection with this process, it should be noted that when the copolycarbonate produced by this process is used for preparing a thermoplastic elastomer, e.g., a polyester-polycarbonate elastomer, ester exchange is likely to occur between the polyester for constituting the hard segments of the elastomer and the copolycarbonate for constituting the soft segments of the elastomer due to the presence of the ester exchange catalyst remaining in the carbonate. Such ester exchange causes the elastomer to have undesirably altered physical properties. This problem can be solved by completely removing the ester exchange catalyst from the copolycarbonate after polymerization. However, for complete removal of the catalyst, time-consuming operations and excess labor are required for polymer dissolution, extraction, drying, etc. To avoid them, it is preferred to synthesize a copolycarbonate without using any catalyst.

The synthesis of a copolycarbonate without any catalyst may be performed by a known method in which ethylene carbonate having the strain energy attributed to a five-membered ring is used or by another method in which diphenyl carbonate, which can readily be dissociated as a phenoxy group, is used. Moreover, the synthesis of a copolycarbonate without the use of any catalyst can be performed by a novel method developed by the present inventors in which dimethyl carbonate is employed. In the method in which diphenyl carbonate is used, the phenol formed by the ester exchange is likely to be reacted with a small amount of oxygen and foreign matters present in the reaction vessel to form a colored substance, thereby rendering produced copolycarbonate colored. In addition, the reaction of diphenyl carbonate with a dihydroxy and/or polyhydroxy compound disadvantageously causes a stainless steel reaction vessel to be corroded by the phenol formed by the ester exchange. Therefore, the method in which ethylene carbonate is used and the method in which dimethyl carbonate is used are preferred.

The method for synthesizing a copolycarbonate in which ethylene carbonate is used, is described below in more detail. This method comprises two steps. That is, in the first step, an aliphatic di- and/or poly-ol mixture comprising at least 1,6-hexanediol and 1,5-pentanediol is mixed with ethylene carbonate in a molar ratio of 20:1 to 1 10, and heated at a temperature of 100° to 300° C. under atmospheric pressure or reduced pressure while distilling off by-produced ethylene glycol and unreacted ethylene carbonate. Thus, there is obtained a reaction mixture containing a low molecular weight copolycarbonate of 2 to 10 recurring units. In the second step, the reaction mixture is heated at a temperature of 100° to 300° C. to effect self-condensation of the low molecular weight copolycarbonate, while distilling off the di- and/or poly-ols and ethylene carbonate which remain unreacted. During this second step, any by-products and unreacted di- and/or poly-ols are continued to be distilled off. Thus, there is obtained a copolycarbonate having desired molecular weight. The structural unit proportion of the copolycarbonate can be controlled by determining the composition of the di- or poly-ol being distilled off and then adding to the reaction system any necessary component of the di- or poly-ols in an appropriate amount.

As mentioned above the desired copolycarbonate polyol can be synthesized without the use of any catalyst by a novel method developed by the present inventors. Accordingly, in another aspect of the present invention, there is provided a method for preparing a copolycarbonate polyol comprising recurring units respectively of the formulae:

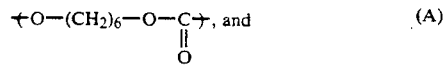

(A)

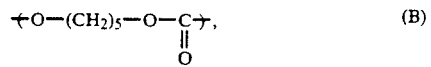

(B)

and terminal groups, the molar proportion of units (A) to units (B) being in the range of from 9:1 to 1:9, substantially all of said terminal groups being hydroxyl groups, which comprises the steps of:

(1) heating a mixture of dimethyl carbonate and an aliphatic di- and/or polyhydroxyl compound mixture comprising at least 1,6-hexanediol and 1,5-pentanediol at a temperature of 120° to 280° C. under atmospheric or super-atmospheric pressure in the absence of a catalyst while distilling off by-produced methanol, thereby obtaining a preliminary reaction mixture; and (2) heating the preliminary reaction mixture at a temperature of 120° to 280° C. under reduced pressure while distilling off by-produced methanol. When the reaction temperature is lower than 120° C., the polymerization rate is unfavorably low. On the other hand, when the reaction temperature is higher than 280° C., the copolycarbonate formed is likely to suffer extensive decomposition. It is more preferred that the reaction temperature be in the range of from 150° to 250° C.

Since the boiling point of dimethyl carbonate is as low as 90° C., in order to maintain the reaction system at a temperature of 120° to 280° C., it is preferred either to charge only a small amount of dimethyl carbonate at the initial stage of the reaction and thereafter continuously add the rest of the dimethyl carbonate little by little, or to continuously add diethyl carbonate little by little from the initial stage of the reaction. Alternatively, the reaction may be performed at higher temperatures, irrespective of the amount of dimethyl carbon 'e, by the use of a pressurizable reaction vessel.

In the method according to the present invention, in order to expedite the reaction, it is necessary to distill off the by-produced methanol continuously. Further, after step (1) and before step (2), it is preferred that any unreacted dimethyl carbonate and di- and/or polyhydroxyl compound be distilled off. Therefore, it is preferred that a reaction vessel provided with a fractionating column be used.

In step (1), the reaction is performed under atmospheric pressure or super-atmospheric pressure. The terminology "super-atmospheric pressure" used herein means several to several tens of atm. In step (2), the reaction is performed under reduced pressure. The terminology "reduced pressure" used herein means 0.05 to 700 mmHg.

The reaction time depends on the amount of materials to be reacted. However, it is generally in the range of from about 10 to 50 hours.

In step (2), it is preferred that the reaction liquor be kept as a thin film during the reaction, which is useful for efficiently distilling off the by-produced methanol. This expedites the reaction to shorten the reaction period. Keeping the reaction liquor as a thin film can be performed by using a suitable device, such as an evaporator, as a reaction vessel and rotating the vessel so as to cause the reaction liquor to be pressed against the wall of the vessel by centrifugal force. Alternatively, formation of the reaction liquor into a thin film may be performed by incorporating into the reaction vessel a rotating element capable of spreading the reaction mixture all over the wall surface of the reaction vessel.

According to the method of the present invention, it is feasible to freely obtain a desired copolycarbonate comprising two or more structural units by controlling the molar ratio of a charged di- or polyhydroxyl compound mixture to charged dimethyl carbonate.

The copolycarbonate having carboxyl groups at its terminal according to the present invention is a novel polymer, and representative examples of such copolycarbonates are represented by the formula:

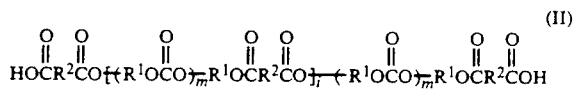

(II)

wherein $R^1$ has the same meaning as defined above; each $R^2$ is independently the residue of an aliphatic or aromatic dicarboxylic acid $HOOC-R^2-COOH$, the residue having 2 to 12 carbon atoms; m is a number having an average value of from 4 to 100; and i is a number having an average value of from 0 to 10.

The above copolycarbonate according to the present invention may be produced by reacting an aliphatic polycarbonate having hydroxyl groups at its terminals as represented by the formula:

(III)

wherein $R^1$ and m are as defined above, with at least one aliphatic or aromatic dicarboxylic acid or a derivative thereof (e.g., an acid anhydride or an acid halide), which dicarboxylic acid is independently represented by the formula:

$$HO-\overset{O}{\underset{\|}{C}}-R^2-\overset{O}{\underset{\|}{C}}-OH \qquad (IV)$$

wherein $R^2$ is the residue of an aliphatic or aromatic dicarboxylic acid, the residue having 2 to 12 carbon atoms.

In the above reaction, the molar ratio of the polycarbonate of formula (III) to the dicarboxylic acid of formula (IV) or a derivative thereof may preferably be in the range of from 1/1.2 to 1/3. More preferably, the ratio may be in the range of from 1/1.5 to 1/2.2. The reaction may be conducted at a temperature of from 100° to 250° C. without any solvent or in a suitable solvent, e.g., a chlorine-containing solvent.

Examples of aliphatic or aromatic dicarboxylic acids of the formula (II) include succinic acid, adipic acid, azelaic acid, pimelic acid, glutaric acid, sabacic acid, decanedionic acid, brassylic acid, terephthalic acid, isophthalic acid and phthalic acid.

In the formula (II), m is a number having an average value of from 4 to 100. When a copolycarbonate represented by formula (II), wherein the average value of m is smaller than 4, is used as a reactive polymer for producing a final polymer, the resistance of the final polymer to hydrolysis and resistance to mildewing are decreased. On the other hand, with respect to a copolycarbonate represented by formula (II), wherein the average value of m is larger than 100, the copolycarbonate cannot be produced easily, because the raw material for the copolycarbonate, namely: a polycarbonate of formula (III), which has at its both terminals hydroxyl groups and in which m is a number having an average value larger than 100, is difficult to prepare.

In formula (II), i is a number having an average value of from 0 to 10. When a copolycarbonate represented by formula (II), wherein i is a number having an average value larger than 10, is used as a reactive polymer for producing a final polymer, the resistance of the final polymer to hydrolysis and mildewing is decreased.

The copolycarbonate having carboxyl groups at its terminals is capable of reacting with a compound having in its molecule a hydroxyl group, an amino group, an isocyanate group or the like. Therefore, copolycarbonates of the present invention having carboxyl groups at its terminals is useful as a modifier for polyesters, polyamides, etc. and as a raw material for polyester elastomers, polyamide elastomers, etc.

The copolycarbonate of the present invention having (meth)acryloyl groups at its terminals (hereinafter often referred to as "(meth)acryloyl group-terminated copolycarbonate)" includes a (meth)acrylate and urethane(meth)acrylate of a copolycarbonate having hydroxyl groups at its terminals.

The copolycarbonate (meth)acrylate is conventionally synthesized. For example, the copolycarbonate (meth)acrylate may be produced as follows. To 0.5 mole of a copolycarbonate polyol is added 1.0 to 2.0, preferably 1.0 to 1.5, moles of (meth)acrylic acid. Then, to the mixture are added a catalyst for esterification, such as p-toluenesulfonic acid, phenothiazine, sulfuric acid or methanesulfonic acid, and a polymerization inhibitor, such as phenothiazine and hydroquinone, each independently in an amount of 0.01 to 5% by weight based on the weight of (meth)acrylic acid. The resultant mixture is heated at 70° to 130° C. and dehydrated, and washed with an alkali and then with water, to thereby remove substances having low boiling points from the mixture. Thus, there is obtained a copolycarbonate (meth)acrylate.

The copolycarbonate urethane(meth)acrylate has a urethane bond in its molecular skeleton and contains not only a polycarbonate structure as a component of the molecular skeleton but also a (meth)acryloyl group in its molecule. The copolycarbonate urethane(meth)acrylate is conventionally synthesized. For example, the copolycarbonate urethane(meth)acrylate may be obtained as follows. 1 Mole of a copolycarbonate polyol, 1.1 to 2.0 moles of a diisocyanate compound and 1.0 to 2.0 moles of a hydroxyalkyl (meth)acrylate are subjected to reaction. These components may be reacted at once. Alternatively, a copolycarbonate polyol and a diisocyanate compound are first reacted with each other, and then reacted with a hydroxyalkyl (meth)acrylate.

As the copolycarbonate polyol which is a raw material for producing the (meth)acryloyl group-terminated copolycarbonate, the hydroxyl group-terminated copolycarbonate as mentioned before is optionally used. It is preferred that the hydroxyl group-terminated copolycarbonate have a number average molecular weight of 500 to 20,000, more preferably 1,000 to 10,000.

As the diisocyanate compound to be reacted with the hydroxyl group-terminated copolycarbonate, there may be used a diisocyanate compound having a molecular weight of from about 170 to about 1000. Examples of diisocyanate compounds include tolylene diisocyanate, diphenylmethane diisocyanate, naphthalene diisocyanate, isophorone diisocyanate, bis(isocyanatemethyl)cyclohexane dicyclohexylmethane diisocyanate, 1,6-hexane diisocyanate and the like.

As the hydroxyalkyl (meth)acrylate to be reacted with hydroxyl group-terminated copolycarbonate, there may be used a compound which contains a hydroxyalkyl group having 1 to 4 carbon atoms. Examples of hydroxyalkyl (meth)acrylates include 2-hydroxyethyl (meth)acrylate, 2-hydroxypropyl (meth)acrylate and the like.

In the reaction for producing the (meth)acryloyl group-terminated copolycarbonate, the reaction between the NCO group and the OH group can proceed in the absence of a catalyst. However, if desired, the reaction may be advanced in the presence of a customary catalyst, for example, a tertiary amine, such as triethylamine; an organometallic compounds, such as dibutyltin dilaurylate and dibutyltin diacetate tin chloride; and the like.

The copolycarbonate of the present invention having (meth)acryloyl groups at its terminals can advantageously be used as a main component for a photocurable resin composition. This copolycarbonate is used together with another type of polymerizable unsaturated compound, such as an unsaturated polyester, an unsaturated polyurethane and an oligoester (meth)acrylate, and with a photopolymerization initiator, thus providing an excellent photocurable resin composition which has excellent transparency and high resistance to light, heat and moisture.

The copolycarbonate of the present invention having allyl groups at its terminals (hereinafter often referred to as "allyl group-terminated copolycarbonate") may be represented by the following general formula (V):

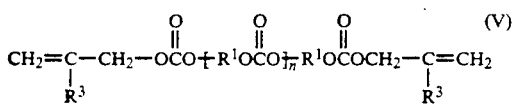

wherein $R^1$ has the same meaning as defined for the general formula (I), $R^3$ is a hydrogen atom, a halogen atom or an alkyl group having 1 to 4 carbon atoms, and n is a number having an average value of from 2 to 200, preferably 4 to 100.

Examples of terminal allyl groups of the allyl group-terminated copolycarbonate include an unsubstituted allyl group, a 2-chloroallyl group, a 2-bromoallyl group, a 2-methylallyl group, a 2-ethylallyl group, a 2-propylallyl group, a 2-butylallyl group and the like. The most representative example is an unsubstituted allyl group, that is, the case in formula (V), where $R^3$ is a hydrogen atom.

The allyl group-terminated copolycarbonate is conventionally produced. For example, the allyl group-terminated copolycarbonate is produced by the reaction of a copolycarbonate polyol having a predetermined molecular weight, which is conventionally synthesized, with an allyl fluoroformate so that carbon-carbon double bonds are introduced into the copolycarbonate.

Further, the allyl group-terminated copolycarbonate is also produced by a method in which a polyol is reacted with diallyl carbonate in the presence of a catalyst for ester exchange reaction (U.S. Pat. No. 4,508,656). According to this method, the desired allyl group-terminated copolycarbonate having a polymerization degree of 1 to 10 can be obtained. If it is desired to increase the polymerization degree, the above-mentioned reaction may further be advanced under reduced pressure while withdrawing an excess amount of the diallyl carbonate from the reaction system so that the condensation is promoted. Furthermore, the allyl group-terminated copolycarbonate is also produced in the absence of a catalyst in substantially the same manner as described before with respect to the production of a hydroxyl group-terminated copolycarbonate, except that diallyl carbonate is used instead of the dimethyl carbonate or ethylene carbonate.

Hereinbelow, a method for producing an allyl group-terminated copolycarbonate in which a catalyst for ester exchange reaction is used is explained in detail.

With respect to the catalyst for ester exchange reaction, it is preferred that the catalyst be available at low cost and can easily be separated from the reaction product by utilizing, for example, the reaction with carbon dioxide gas, or simply by washing. From the standpoint of the above, alkali metal alcoholates are preferred. Among them, sodium methylate is more preferred. The above-mentioned catalyst may also be separated from the reaction product by treatment with an organic acid or an inorganic acid, or by passing the reaction mixture through a sulfonated acidic resin. As catalyst, there may also be used an organic acid; an inorganic acid; a transition metal alcoholate, such as $Ti(OR)_4$ and $MgTi(OR)_6$, wherein each R is an organic group, (the transition metal alcoholate may be in the form of a double salt); a metal oxide, such as CaO, ZnO and $SnO(OR)_2$; and mixtures thereof, although these compounds are relatively expensive and difficult to separate from the reaction product as compared to the above-mentioned alkali metal alcoholate.

The catalyst may be used in an amount of from 0.001 to 0.5%, preferably about 0.01%, by weight based on the total weight of raw materials charged.

Using the above-mentioned catalyst, the allyl group-terminated copolycarbonate is produced as follows. The process for the production of the copolycarbonate consists of two steps. In the first step, a diallyl carbonate is used in an amount larger than the stoichiometric amount for producing an intended copolycarbonate. The molar ratio of the diallyl carbonate to the polyol is preferably 5:1 to 10:1. The reaction temperature may generally be about 100° to about 150° C., preferably about 120° C. The reaction pressure is one which makes it possible to remove the by-produced allyl alcohol by evaporation at the reaction temperature immediately upon formation thereof, substantially without causing evaporation of the unreacted diallyl carbonate which remains in the reaction mixture. From the standpoint of the above, the reaction is generally conducted under a pressure of about 50 to about 300 Torr. Under the above-mentioned conditions, the reaction is generally conducted for about 0.5 to about 3 hours so that the reaction of the polyol with the diallyl carbonate is substantially completed. Actually, by the end of the first step, the formation of the by-produced allyl alcohol ceases. Therefore, the reaction is regarded as being finished. Thus, in the first step, the desired allyl group-terminated carbonate having a polymerization degree of 1 to 10 is produced.

In the second step, the pressure in the reaction vessel is reduced to about 1 Torr or less and the reaction mixture is heated at 70° to 200° C., preferably 90° to 150° C. The catalyst used exerts catalytic activity in the second step at the same concentration as in the first step. Under the above-mentioned conditions, the unreacted diallyl carbonate remaining at the end of the first step is first removed by evaporation, and then the chain extension reaction of the allyl group-terminated carbonate formed in the first step is caused to occur so that the polymerization degree of the allyl group-terminated carbonate is increased. During the chain extension, the liberated diallyl carbonate is removed by evaporation. The chain extension is terminated when an allyl group-terminated copolycarbonate having the desired molecular weight is formed. Whether or not an allyl group-terminated copolycarbonate having the desired molecular weight is formed can easily be examined by measurement of the viscosity of the reaction mixture.

When the allyl group-terminated copolycarbonate of the present invention is reacted with a hydrosilane compound, as will be explained later, there can be obtained a copolycarbonate which is useful as a raw material for a sealant which is curable at widely varied environmental temperatures. Further, the allyl group-terminated copolycarbonate of the present invention is advantageously used as a raw material for optics, such as a lens and an optical fiber and other parts of an optical device.

The copolycarbonate of the present invention having carbonic acid ester groups at its terminals (hereinafter often referred to as "carbonate group-terminated copolycarbonate") may be represented by formula (VI):

wherein R¹ has the same meaning as defined for the formula (I), R⁴ is an alkyl group having 1 to 10 carbon atoms or aryl group having 6 to 10 carbon atoms, and 1 is a number having an average value of from 2 to 200.

Examples of alkyl groups include a methyl group, an ethyl group and a propyl group. Examples of aryl groups include a phenyl group and a substituted phenyl group.

The carbonate group-terminated copolycarbonate may be synthesized in substantially the same manner as in the production of the above-mentioned allyl group-terminated copolycarbonate, except that a dialkyl carbonate or diaryl carbonate is used instead of the diallyl carbonate. When dimethyl carbonate is used as a dialkyl carbonate, or when a diaryl carbonate is used, the carbonate group-terminated copolycarbonate is advantageously produced in the presence of a catalyst.

The copolycarbonate of the present invention having a substituted silyl group at least at its one terminal (hereinafter often referred to as "substituted silyl group-terminated copolycarbonate") may be represented by the following formula (VII):

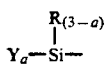   (VII)

wherein R is a hydrogen atom or a monovalent hydrocarbon residue having 1 to 10 carbon atoms, each Y is independently a member selected from the group consisting of a halogen atom, an alkoxy group, a phenoxy group, an acyloxy group, an aminoxy group, a thioalkoxy group or an amino group, and a is an integer of 1 to 3.

Examples of monovalent hydrocarbon groups and residues include alkyl groups, such as a methyl group and an ethyl group; and aryl groups, such as a phenyl group and a substituted phenyl group.

The substituted silyl group-terminated copolycarbonate of the present invention has a number average molecular weight of about 300 to about 20,000, preferably 500 to 30,000 and is reactive at room temperature. According to use, the substituted silyl group-terminated copolycarbonate may have to be in liquid state at room temperature. In such a case, there is used a substituted silyl-terminated copolycarbonate having such a number average molecular weight that the copolycarbonate is liquid at room temperature. The range of the number average molecular weight within which the substituted silyl-terminated copolycarbonate is liquid at room temperature varies according to the type of starting polyol employed for producing an aliphatic copolycarbonate having a carbon-carbon double bond at least at its one terminal, which is the raw material for the substituted silyl-terminated copolycarbonate.

The number average molecular weight may be determined by a customary GPC method in which a polyethylene glycol having a known number average molecular weight is used as a standard material.

The method for producing the substituted silyl group-terminated copolycarbonate will be explained below.

The substituted silyl group-terminated copolycarbonate is produced by reacting an aliphatic copolycarbonate having a carbon-carbon double bond (at least at its one terminal) with a silane compound represented by formula (VIII):

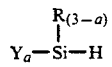   (VIII)

wherein R, Y and a have the same meanings as defined for general formula (VII), in the presence of a catalyst, for example, a complex of a transition metal belonging to Group VIII of the periodic table, such as platinum, rhodium, cobalt, palladium and nickel.

As catalyst, any type of complex of the above-mentioned transition metals is used. Examples of the complexes of the above-mentioned transition metals include complexes of halides thereof, such as chloride and bromide; complexes of nitrates thereof; complexes with carbonyl compounds, such as acetic acid; complexes with a phosphorus-containing compound, such as triphenylphosphine; and the like.

The silylation reaction is generally performed at 50° to 150° C. for 1 to 4 hours.

Examples of silane compounds represented by the above-mentioned formula (VIII) include halogenated silanes, such as trichlorosilane, methyldichlorosilane dimethylchlorosilame and phenyldichlorosilane; alkoxysilanes, such as trimethoxysilane, triethoxysilane, methyldiethoxysilane and phenyldimethoxysilane; acyloxysilanes, such as triacetoxysilane, methyldiacetoxysilane and phenyldiacetoxysilane; triaminoxysilane; methyldiaminoxysilane; methyldiaminosilane; and the like.

It is preferred that the silane compound be used in a molar amount 0.5 to 2 times that of the carbon-carbon double bond of the aliphatic copolycarbonate having a carbon-carbon double bond at least at its one terminal.

The aliphatic copolycarbonate having a carbon-carbon double bond at least at its one terminal is a polymer comprising a recurring unit of formula (IX):

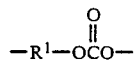   (IX)

wherein R¹ has the same meaning as defined for formula (I). Examples of aliphatic copolycarbonates include an allyl group-terminated copolycarbonate as mentioned before.

Of the above-mentioned silane compounds of formula (VIII), a halogenated silane is more preferred because it is easily available at low cost. Therefore, even in the case where a copolycarbonate having, at least at its one terminal, a substituted silyl group other than a halogenated silyl group is produced, it is advantageous for saving production costs to react a halogenated silane compound first with an allyl group-terminated aliphatic copolycarbonate to prepare a halogenated silyl group-terminated copolycarbonate and, then, to convert the halogen atom of the halogenated silyl group-terminated copolycarbonate to a hydrolyzable group, that is, an alkoxy group, a phenoxy group, an acyloxy group, an aminoxy group, a thioalkoxy group, an amino group or the like. The conversion of the halogen atom t the above-mentioned hydrolyzable group is conducted, e.g., by reacting the halogenated silyl group-terminated copolycarbonate with (1) an alcohol, such as methanol and ethanol, or an alkali metal salt thereof; (2) a phenol, such as phenol and o-cresol, or a metal salt thereof; (3) an alkyl ortho-formate, such as methyl ortho-formate; (4) a hydroxylamine, such as N,N-dimethylhydroxylamine, or an alkali metal salt thereof; (5) a primary or secondary amine, such as N,N'-dimethylamine and pyrrolidine, or an alkali metal salt thereof; (6) a thioalcohol, such as ethyl mercaptan, or an alkali metal salt thereof; or (7) a thiophenol, such as thiophenol, or an alkali metal salt thereof.

The substituted silyl group-terminated copolycarbonate forms a network structure upon exposure to air at room temperature and, therefore, the copolycarbonate can advantageously be used as a sealant. Further, since the substituted silyl group-terminated copolycarbonate is excellent in weatherability, it can advantageously be used in various fields.

Descriptions will now be made with respect to final polymers which are prepared from the copolycarbonates of the present invention.

As mentioned before, the present invention also includes a polyurethane obtained from the above-mentioned hydroxyl group-terminated copolycarbonate, i.e., a copolycarbonate polyol. The polyurethane of the present invention may be produced by reacting a copolycarbonate polyol with a polyisocyanate. If desired, the reaction is conducted using a chain extender having at least two active hydrogen atoms per molecule which are reactive with the isocyanate groups of the polyisocyanate.

As the copolycarbonate polyol to be used for producing the polyurethane of the present invention, the same copolycarbonate polyols as mentioned before may be used. The number average molecular weight of the copolycarbonate polyol may generally be 500 to 30,000, preferably 600 to 20,000, more preferably 700 to 6,000.

Examples of polyisocyanates to be used for producing the polyurethane of the present invention include aromatic diisocyanates, such as 2,4-tolylene diisocyanate, 2,6-tolylene diisocyanate, a mixture of 2,4- and 2,6-tolylene diisocyanates (TDI), diphenylmethane-4,4'-diisocyanate (MDI), naphthalene-1,5-diisocyanate (NDI), 3,3'-dimethyl-4,4'-biphenylene diisocyanate (TODI), crude TDI, polymethylenepolyphenyl isocyanurate, crude MDI, xylylene diisocyanate (XDI) and phenylene diisocyanate; aliphatic diisocyanates, such as 4,4'-methylene-biscyclohexyl diisocyanate (hydrogenated MDI), hexamethylene diisocyanate (HMDI), isophorone diisocyanate (IPDI) and cyclohexane diisocyanate (hydrogenated XDI); and modified products thereof, such as isocyanurates, carbodiimides and allophanamides.

As the chain extender, there may be employed a customary chain extender used for producing a polyurethane as described in, for example, "Saishin Poriuretan Oyo-gijutsu (Latest Application Techniques of Polyurethane)" edited by Keiji Iwata, pp. 25-27, CMC, 1985, Japan. Examples of chain extenders include water, a low molecular weight polyol, a polyamine and the like.

In producing the polyurethane of the present invention, if desired, a conventional polyol may also be used in combination with the copolycarbonate polyol of the present invention as long as the properties of the produced polyurethane are not adversely affected. As the conventional polyol, there may be employed those as described in pp. 12-23, for example, "Polyurethane Foam" by Yoshio Imai, published by Kobunshi Kankokai, Japan, (1987). Examples of customary polyols include polyester, polyether polycarbonate and the like.

For preparing the desired polyurethane, a urethane formation technique known in the art may be utilized. For example, the copolycarbonate polyol of the present invention is reacted with an organic polyisocyanate at a temperature of from room temperature to 200° C. to form a polyurethane prepolymer having NCO terminals. This polyurethane prepolymer, which cures by reaction with atmospheric moisture, can be used for a one-pack solventless adhesive, a sealant and the like. The polyurethane prepolymer can also be used, in combination with another polyol and a conventional crosslinking agent which is a low molecular weight compound having at least two active hydrogen atoms capable of reacting with an isocyanate, for a two-pack potting or casting material. Further, the copolycarbonate polyol of the present invention, a polyisocyanate and, if desired, a chain extender may be reacted through a one-shot process, a prepolymer process or a reaction injection molding (RIM) process to prepare a crosslinked or thermoplastic polyurethane.

In these urethane formation reactions, a conventional polymerization catalyst, such as a tertiary amine and an organic salt of a metal, e.g., tin and tianium, may be employed (see, for example, "Polyurethane resin" edited by Keiji Iwata, pages 23 to 32, published in 1969 by Nikkan Kogyo Simbun, Ltd., Japan). These reactions may be conducted in a solvent. Representative examples of solvents include dimethylformamide, diethylformamide, dimethyl sulfoxide, dimethylacetamide, tetrahydrofuran, methyl isobutyl ketone, dioxane, cyclohexanone, benzene, toluene and ethyl cellosolve.

In the urethane formation reaction, a compound having only one active hydrogen atom capable of reacting with an isocyanate group, for example, a monohydric alcohol, such as ethyl alcohol and propyl alcohol, and a secondary amine, such as diethylamine and di-n-propylamine, may be used as a reaction terminator.

The polyurethane of the present invention has a number average molecular weight of 10,000 to 500,000, preferably 30,000 to 300,000, as measured by a customary GPC method in which a polystyrene having a known number average molecular weight is used as a standard sample.

In the following, some of the uses of the polyurethane of the present invention are described.

(1) First, pellets of a substantially linear thermoplastic polyurethane are prepared. Then, the pellets are melted and subjected to injection molding, extrusion molding or calendering to form a shaped article, such as an elastomer film or sheet, a hose, a tube, rolls or a gear.

(2) A copolycarbonate polyol is reacted with an organic polyisocyanate to form a polyurethane prepolymer having isocyanate terminals. The prepolymer, which cures by reaction with atmospheric moisture, can be used as an adhesive and a sealant. The prepolymer is reactive with a polyisocyanate in the presence of a diol or diamine chain extender and, hence, it can be used as an adhesive, a sealant, a potting or casting material and a coating material.

(3) A polyurethane solution obtained by dissolving polyurethane material or polyurethane-forming materials in a solvent is used as a coating material for a synthetic leather, an artificial leather, fibers and a nonwoven fabric. A dispersion obtained by dispersing a magnetic powder or an electrically conductive powder in such a polyurethane solution is used as a coating material for a magnetic tape or as an electromagnetic sealing material. Further, a dispersion obtained by dispersing a pigment or a staining agent in such a polyurethane solution is used as an ink for gravure printing or coating.

(4) Additives, such as a Freon type foaming agent, a catalyst, a foam stabilizer and a fire retardant are blended with the polycarbonate polyol of the present invention, and an organic polyisocyanate or a polyurethane prepolymer having isocyanate terminals is added thereto. The resultant mixture is stirred at high speed to obtain a thermosetting urethane foam product.

(5) A polyurethane prepolymer having isocyanate terminals is dissolved in a solvent. To the resultant solution is added a conventional diamine or diol chain extender to prepare a spinning solution. The spinning solution is subjected to dry, wet or melt spinning to obtain an elastic fiber.

The polyurethane of the present invention has not only excellent resistance to abrasion, impact, hydrolysis, oxidative degradation and light, but also extremely excellent elastic recovery as well as pliability at low temperatures and flexibility. Therefore, the polyurethane of the present invention has a wide variety of uses in which conventional polyurethanes have been employed. Namely, the polyurethane of the present invention is useful for obtaining rigid, semirigid and flexible articles. Such articles include, for example, an open-cell foam (such as a cushioning material), a closed-cell foam (such as a micro-cellular insole), a film, a sheet, a tube, a hose, a vibration-proof material, a packing, an adhesive, a binder, a sealant, a waterproof material, a flooring, a potting or casting material, a coating material, an elastic fiber and the like.

Next, a description is made with respect to a polyamide-polycarbonate block copolymer. The polyamide-polycarbonate block copolymer comprising a copolycarbonate of the present invention, in which substantially all of the terminals are carboxyl groups, is a novel copolymer. The polyamide-polycarbonate block copolymer comprises a block of the formula:

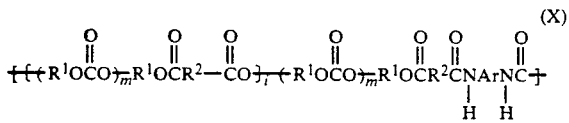
(X)

wherein $R^1$ and $R^2$ have the same meanings as defined for formula (II), Ar is the residue of an aromatic diamine or an aromatic diisocyanate, and m and i have the same meanings as defined for formula (II), and a block of the formula:

(XI)

wherein $R^2$ and Ar have the same meanings as defined for formula (X). The copolymer has a weight average molecular weight of from 10,000 to 500,000 and has a weight ratio of the block of formula (X) to the block of formula (XI) of from 95/5 to 10/90.

For preparing the polyamide-polycarbonate block copolymer, there may be employed various methods. One of the methods is as follows:

An aliphatic polycarbonate having carboxyl terminals of the formula:

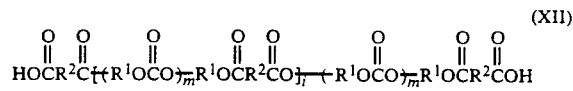
(XII)

wherein $R^1$, $R^2$, m and i are as defined for formula (X), and a dicarboxylic acid of formula:

(XIII)

wherein $R^2$ is as defined for formula (X), are reacted with an aromatic diisocyanate of the formula:

$$OCNArNCO \quad (XIV)$$

wherein Ar is as defined for formula (X).

It is important that the polyamide-polycarbonate block copolymer have the blocks respectively of formula (X) and formula (XI). In the above-mentioned process, a catalyst may be used. Representative examples of catalysts include a phosphorus compound, such as 1-phenyl-3-methyl-2-phosphorene-1-oxide, 1-phenyl-3-methyl-2-phosphorene-1-sulfide and 1,3-dimenthyl-2-phosphorene-1-oxide; a tertiary amine, such as triethylenediamine; an alkali metal alcoholate, such as lithium methylate, sodium methylate and potassium t-butylate; and an alkali metal lactamate, such as sodium propiolactamate. The reaction is conducted at a temperature of from 100° to 280° C. in the presence or absence of a solvent. As solvent, sulfolane, diphenylsulfone or the like is preferably employed.

The process for preparing the polyamide-polycarbonate block copolymer is not limited to the above process.

With respect to the polycarbonate having carboxyl terminals of formula (XII), the same explanation as described hereinbefore with respect to the polycarbonate of formula (II) is applied.

Representative examples of dicarboxylic acids of formula (XIII) include aliphatic or aromatic dicarboxylic acids, such as succinic acid, adipic acid, azelaic acid, pimeric acid, glutaric acid, sebacic acid, dodecanedioic acid, brassylic acid, terephthalic acid, isophthalic acid and phthalic acid. These are used individually or in combination.

Representative examples of Ar in formula (X) include the residues of aromatic diisocyanates, such as diphenylmethane-4,4-diisocyanate, diphenyl ether-4,4-diisocyanate, 2,4-tolylene diisocyanate and 2,6-tolylene diisocyanate. These are used individually or in combination.

In formula (X), n is a number having an average value of from 4 to 100. When the average value of n is less than 4, obtained copolymer has poor physical properties. On the other hand, when the average value of n is greater than 100, it is difficult to obtain a copolymer comprising blocks respectively of formulae (X) and (XI).

In formula (X), i is a number having an average value of from 0 to 10. When the average value of i is greater than 10, obtained copolymer is likely to be unsatisfactory in resistance to hydrolysis.

The polyamide-polycarbonate block copolymer of the present invention has a weight average molecular weight of from 10,000 to 500,000, preferably from 20,000 to 200,000. The weight average molecular weight of the copolymer is measured by means of gel permeation chromatography (GPC). As the calibration curve for the GPC, a curve prepared using a standard polystyrene is employed.

In the polyamide-polycarbonate block copolymer of the present invention, the weight ratio of blocks of formula (X) to blocks of formula (XI) is in the range of from 95/5 to 10/90, preferably from 90/10 to 20/80.

Into the polyamide-polycarbonate block copolymer, if desired, there may be incorporated an antioxidant, a thermal stabilizer, a light stabilizer, a pigment, an inorganic filler, a reinforcing agent, such as a glass fiber and the like.

The novel polyamide-polycarbonate block copolymer is a thermoplastic polymer having not only excellent resistance to heat, light, hydrolysis and oil, but also excellent elastomeric properties. Therefore, the polyamide-polycarbonate block copolymer of the present invention is useful for preparing parts of an automobile, parts of an appliance and electrical parts which are required to have more excellent properties in recent years.

Conventional copolymers which have soft segments consisting mainly of an aliphatic polyester are poor in resistance to hydrolysis so that when molded articles made of such copolymers are exposed to high humidity and high temperature for a prolonged period of time, the mechanical properties of the molded articles are likely to become poor. Other conventional copolymers which have soft segments consisting mainly of an aliphatic polyether have poor resistance to light so that they are not suitable for outdoor use (see U.S. Pat. No. 4,129,715).

As opposed to these conventional copolymers, the copolymer of the present invention is free from such problems by virtue of its structure in which the novel copolycarbonate of the present invention is used as soft segments.

Now, the polyester-polycarbonate block copolymer obtained from the novel copolycarbonate is described.

The polyester-polycarbonate block copolymer obtained from copolycarbonate of the present invention, in which substantially all of its terminals are hydroxyl groups, is a novel copolymer. Two representative examples of polyester-polycarbonate block copolymers are described hereinafter.

The first representative example is a copolymer comprising from 10 to 90% by weight, based on the total weight of blocks of formula (XV) and formula (XVI), of a block of the formula:

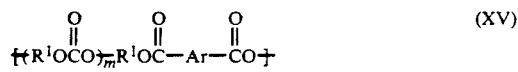 (XV)

wherein each $R^1$ in the majority of the recurring units in formula (XV) is independently selected from an aliphatic glycol residue having 5 carbon atoms and an aliphatic glycol residue having 6 carbon atoms, the weight ratio of aliphatic glycol residue having 5 carbon atoms to aliphatic glycol residue having 6 carbon atoms being within the range of from 35/65 to 65/35, Ar represents an aromatic dicarboxylic acid residue; and m is a number having an average value of from 4 to 100; and from 90 to 10% by weight, based on the total weight of blocks of formula (XV) and formula (XVI), of a block of the formula:

 (XVI)

wherein $R^5$ represents an aliphatic glycol residue having 2 to 6 carbon atoms, and Ar is as defined for formula (XV).

The above copolymer has a weight average molecular weight of from 10,000 to 500,000.

The polyester-polycarbonate block copolymer of the present invention may be produced by, for example, reacting an aliphatic copolycarbonate diol represented by formula (XVII):

 (XVII)

wherein $R^1$ and m have the same meanings as defined for formula (XV), an aliphatic glycol represented by formula (XVIII):

 (XVIII)

wherein $R^5$ has the same meaning as defined for formula (XVI), with a derivative of an aromatic dicarboxylic acid represented by general formula (XIX), which is capable of forming an ester:

 (XIX)

wherein Ar has the same meaning as defined for formulae (XV) and (XVI), in a solvent or in the molten state at 150° to 250° C. As the ester-forming derivative of an aromatic dicarboxylic acid, there may be used, for example, terephthaloyl chloride. If desired, the reaction may be advanced in the presence of a catalyst for condensation polymerization which is customarily used for producing a polyester. Examples of catalysts include tetraalkyl titanate, zinc acetate, lead propionate, dibutyltin oxide and the like.

The method for producing the polyester-polycarbonate block copolymer of the present invention is not limited, and any method may be used as long as a block copolymer comprising two types of blocks respectively of the above-mentioned formulae (XV) and (XVI) can be produced.

The terminals of the polyester-polycarbonate block copolymer of the present invention may be modified with, for example, a diepoxy compound and a diisocyanate compound. The soft segment of the polyester-polycarbonate block compolymer is basically constituted by a copolycarbonate of the present invention which provides excellent resistance to light and hydrolysis. To the soft segment, a small amount of the other component, such as an aliphatic polyether and an aliphatic polyester, may be introduced as long as the properties of the copolymer, such as resistance to light and hydrolysis, is not adversely affected.

If desired, the polyester-polycarbonate block copolymer of the present invention may have incorporated therein an additive, such as an antioxidant, a thermal stabilizer, a light stabilizer, a pigment, an inorganic reinforcing filler and other reinforcing material.

Each $R^1$ in the majority of the recurring units in formula (XV) is independently a member selected from a hexamethylene group and a pentamethylene group, both of which are concurrently present. Details of such a copolycarbonate have been described earlier.

The ratio of hexamethylene groups to pentamethylene groups in block (XV) is from 35:65 to 65:35 by weight. If the ratio is outside this range, the elastomeric properties, such as elastic recovery, of the polyester-polycarbonate copolymer are likely to be unsatisfactory.

m in block (XV) is a number having an average value of from 4 to 100. If the average value of m is smaller than 4, the elasticity of the polyester-polycarbonate copolymer is insufficient. On the other hand, if the average value of m is larger than 100, the polyester-polycarbonate copolymer would become unsatisfactory in desired properties.

Ar in blocks (XV) and (XVI) is an aromatic dicarboxylic acid residue. As examples of aromatic dicarboxylic acid residues, there may be mentioned residues obtained by removing the carboxyl groups from an aromatic dicarboxylic acid, such as terephthalic acid, isophthalic acid, 1,5-naphthalene dicarboxylic acid, 2,6-naphthalene dicarboxylic acid, diphenyl-4,4'-dicarboxylic acid and 4,4'-diphenoxyethane dicarboxylic acid. Of them, the terephthalic acid residue is most preferred. These residues may be present individually or in combination.

$R^5$ in block (XVI) of the polyester-polycarbonate copolymer is an aliphatic glycol residue. As examples of aliphatic glycol residues, there may be mentioned residues obtained by removing the hydroxyl group from an aliphatic glycol, such as ethylene glycol, propylene glycol, 1,4-butanediol, 1,5-pentanediol and 1,6-hexanediol. Of them, the ethylene glycol residue and 1,4-butanediol residue are most preferred. These residues may be present individually or in combination.

With respect to the polyester-copolycarbonate block copolymer of the present invention, it is requisite that the proportions of block (XV) and block (XVI) be respectively in the range of from 10 to 90% by weight, preferably from 30 to 80% by weight and in the range of 90 to 10% by weight, preferably from 70 to 20% by weight. If the respective proportions of blocks are out of the above-mentioned ranges, the desired physical properties of the block copolymer cannot be obtained. The weight average molecular weight of the polyester-copolycarbonate block copolymer of the present invention is in the range of from 10,000 to 500,000, preferably in the range of from 20,000 to 200,000. The weight average molecular weight is measured by GPC using a calibration curve based on a standard polystyrene.

In the copolymer of the present invention, the recurring units in block (XV) which are represented by the formula:

wherein $R^1$ has the same meaning as defined therein, do not recur in a specific sequence, but recur at random.

The second representative example of the copolymer of the present invention is a copolymer having an average molecular weight of from 10,000 to 500,000 and comprising 10 to 90% by weight of a block of formula (XX) and 90 to 10% by weight of a block of formula (XXI). The formulae (XX) and (XXI) are respectively:

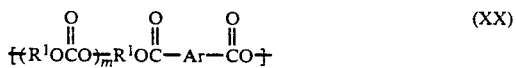

wherein $R^1$, Ar and m have the same meanings as defined for formula (XV); and

wherein $R^6$ is a divalent phenol residue and Ar is as defined above.

The differences between the first representative type of copolymer comprising blocks respectively of formulae (XV) and (XVI) and the second representative type of copolymer comprising blocks respectively of formulae (XX) and (XXI) reside in that, in the second representative type of copolymer, the weight ratio of hexamethylene groups to pentamethylene groups is not limited to the preferred range of from 35:65 to 65:35 but may be in the range of from 9:1 to 1:9, and that divalent phenol residues are contained in the second representative type of copolymer in place of the aliphatic glycol residues in the first representative type of copolymer. Examples of divalent phenol residues ($R^6$) include the residues of bis(4-hydroxyphenyl)methane, bis(4-hydroxy-3,5-dimethylphenyl)methane, bis(4-hydroxyphenyl)propane, bis(4-hydroxyphenyl)sulfide, bis(4-hydroxy-3,5-dimethylphenyl)sulfone, 4,4'-dihydroxydiphenyl ether, bis(4-hydroxyphenyl) ketone, bis(4-hydroxyphenyl)sulfone, 4,4'-dihydroxydiphenyl, hydroquinone and resorcinol. These residues may be used individually or in combination.

The second representative example of the present polyester-copolycarbonate block copolymer may be produced by substantially the same method as described for producing the first representative example of the block copolymer.

The novel polyester-copolycarbonate block copolymer according to the present invention not only has excellent resistance to heat, oil, light and hydrolysis, but also has excellent elastomer properties, such as elastic recovery. Accordingly, the present block copolymer can be advantageously used for fabricating automobile parts, general apparatus parts and electrical components for which property improvement has been increasingly demanded in recent years.

Japanese Patent Application Laid-Open Specification No. 62-292833 discloses a polyester-polycarbonate copolymer having aliphatic polycarbonate units as soft segments, which has a structure similar to that of the first representative example of the present polyester-copolycarbonate block copolymer and is improved in elastomer properties. However, all or most of the above-mentioned soft segments consist of an aliphatic polycarbonate having residues of a single type of alkanediol, and it is prescribed that the content of other diol residues be limited to 30% or less. These soft segments have excellent resistance to light, hydrolysis, etc., but have a disadvantage in that they are inferior to conventional ether or ester soft segments in essential properties required for an elastomer, e.g., elastic recovery. This disadvantage has been completely removed by the first representative example of the present polyester-copolycarbonate copolymer in which the copolycarbonate of the present invention is used as soft segments.

DETAILED DESCRIPTION OF THE PREFERRED EMBODIMENTS

This invention will now be described in detail with reference to the following Examples and Comparative Examples but they should not be construed as limiting the scope of the present invention. In the Examples and Comparative Examples, all "parts" are given on a weight basis.

Preparation of hydroxyl group-terminated copolycarbonates

In Examples 1 to 9 and Comparative Examples 1 to 4 described below, various measurements were conducted as follows. The hydroxyl values of the copolycarbonates were determined by the customary acetylation method. The glass transition temperatures ($T_g$) and the melting points ($T_m$) of the copolycarbonates were determined by differential scanning calorimetry (DSC) (temperature elevation rate: 10° C./min and temperature range of measurement: −150° C. to 60° C.). The types of terminal groups of the copolycarbonates were examined by $C^{13}$—NMR (270 MHz) study.

In addition the acid values of the copolycarbonates were determined by titration with KOH. As a result, it was found that none of the copolycarbonates had acid values exceeding 0.01. Accordingly, the number average molecular weights ($\overline{M}n$) of the copolycarbonates were calculated from the following formula.

$$\overline{M}n = 2/(\text{hydroxyl value} \times 10^{-3}/56.11)$$

EXAMPLES 1 TO 6 AND COMPARATIVE EXAMPLES 1 TO 3

Various copolycarbonates were prepared in the following manner. A polyol or polyols (hereinafter referred to simply as "polyols") indicated in Table 1 were charged in a reaction vessel provided with a stirrer, a thermometer and a fractionating column. To the polyols in the reaction vessel was added metallic sodium in the amount indicated in Table 1 while stirring at 70° to 80° C. to effect reaction. After metallic sodium was completely reacted, diethyl carbonate was introduced into the reaction vessel in the amount indicated in Table 1 and reaction was continued under atmospheric pressure while gradually elevating the reaction temperature up to 160° C. When the reaction temperature was elevated to 95° to 100° C., ethanol began to be distilled off. The elevation in the reaction temperature from 100° C. up to 160° C. was effected over the period of time indicated in Table 1. During the period, a mixture of ethanol and about 10% by weight, based on the total weight of the mixture, of diethyl carbonate was distilled off. Then, the pressure within the reaction vessel was lowered to 10 mmHg or less and reaction was effected at 200° C. for the period of time indicated in Table 1, while vigorously stirring and removing distilled ethanol from the flask. The resultant polymer was cooled, dissolved in dichloromethane and neutralized with a dilute acid. The polymer was then washed with water several times and dehydrated with anhydrous sodium sulfate. After removing the solvent from the polymer by distillation, the polymer was dried at 140° C. under a pressure of 2 to 3 mmHg for several hours to obtain a copolycarbonate. The hydroxyl value, $T_g$ and $T_m$ of each of the thus obtained copolycarbonates are indicated in Table 1 together with the state of each copolycarbonate at room temperature. Further, it was found by $C^{13}$—NMR study that, with respect to each of the copolycarbonates, substantially all of the terminal groups were hydroxyl groups.

TABLE 1

| | Formulation | | | | | Reaction time | | Characteristics of copolymer | | | |
|---|---|---|---|---|---|---|---|---|---|---|---|
| | Polyol | | | | | Period of time in which the reaction was effected at 100° to 160° C. under atmospheric pressure (hr) | Period of time in which the reaction was effected at 200° C. under reduced pressure (hr) | State of copolymer at room temperature | Hydroxyl value (mgKOH/g) | $T_g$ (°C.) | $T_m$ (°C.) |
| | 1,6-Hexanediol, g(mole) | 1,5-Pentanediol, g(mole) | Other polyol, g(mole) | Metallic sodium, g(mole) | Diethylcarbonate, g(mole) | | | | | | |
| Example 1 | 472 (4.0) | 416 (4.0) | — | 1.84 (0.08) | 472 (8.0) | 6 | 4 | Viscous liquid | 56.0 | −56 | — (amorphous) |
| Example 2 | 4.72 (0.04) | 16.64 (0.16) | — | 0.046 (0.002) | 22.42 (0.19) | 6 | 0.5 | Viscous liquid | 58.3 | −68 | — (amorphous) |
| Example 3 | 14.16 (0.12) | 8.32 (0.08) | — | 0.046 (0.002) | 22.42 (0.19) | 6 | 0.5 | Viscous liquid | 59.6 | −70 | — (amorphous) |
| Example 4 | 189 (1.6) | 42 (0.4) | — | 0.46 (0.02) | 225 (1.9) | 4 | 0.3 | White sherbet form | 68.0 | −57 | 24 |
| Example 5 | 496 (4.2) | 437 (4.2) | 1,4-butanediol 144 (1.6) | 2.3 (0.1) | 590 (10.0) | 6 | 4 | Viscous liquid | 53.3 | −60 | — (amorphous) |
| Example 6 | 472 (4.0) | 416 (4.0) | trimethylolpropane 72 (0.53) | 1.84 (0.08) | 472 (8.0) | 4 | 4 | Viscous liquid | 92.9 | −56 | — (amorphous) |
| Comparative Example 1 | 236 (2.0) | — | — | 1.84 (0.08) | 225 (1.9) | 6 | 4 | White solid | 50.0 | −57 | 42 |

TABLE 1-continued

| | Formulation | | | | | Reaction time | | Characteristics of copolymer | | | |
|---|---|---|---|---|---|---|---|---|---|---|---|
| | Polyol | | | | | Period of time in which the reaction was effected at 100° to 160° C. under atmospheric pressure (hr) | Period of time in which the reaction was effected at 200° C. under reduced pressure (hr) | State of copolymer at room temperature | Hydroxyl value (mgKOH/g) | Tg (°C.) | Tm (°C.) |
| | 1,6-Hexanediol, g(mole) | 1,5-Pentanediol, g(mole) | Other polyol, g(mole) | Metallic sodium, g(mole) | Diethylcarbonate, g(mole) | | | | | | |
| Comparative Example 2 | — | 208 (2.0) | — | 1.84 (0.08) | 225 (1.9) | 6 | 4 | White solid | 90.0 | −55 | 42 |
| Comparative Example 3 | 472 (4.0) | — | 1,4-butanediol 360 (4.0) | 1.84 (0.08) | 472 (8.0) | 6 | 4 | Viscous liquid | 58.1 | −58 | — (amorphous) |

EXAMPLE 7

236 Grams (2 mol) of 1,6-hexanediol and 208 g (2 mol) of 1,5-pentanediol were charged in a 1 l separable flask provided with a Widmer spiral having on its top a partial reflux condenser in which a coolant comprising dry ice and methanol was used. Into the flask dimethyl carbonate was dropped continuously for 6.5 hrs while stirring at 150° to 190° C. to effect reaction. During the reaction, a mixture of methanol and 0 to 30% by weight, based on the total weight of the mixture, of dimethyl carbonate was distilled off through a partial reflux condenser. The proportion of dimethyl carbonate in the mixture was determined by gas chromatography. The amount of dimethyl carbonate to be dropped into the flask was controlled so that the molar ratio (r) of the reacted dimethyl carbonate to the charged diols became 0.913. The amount of dimethyl carbonate which reacted with the diols was assumed as the amount obtained by subtracting the amount of dimethyl carbonate which was distilled off from the amount of dimethyl carbonate which was dropped into the flask.

After the dropping of dimethyl carbonate, the pressure within the flask was gradually decreased from 700 mmHg to about 10 mmHg by means of a vacuum pump while maintaining the temperature within the flask at 180° to 250° C., and reaction was effected for 3.5 hrs. Then, the pressure within the flask was further decreased from 10 mm Hg to 0.05 mmHg and reaction was effected for 15 min. During the reaction, there was obtained a distillate in the trap connected to the partial reflux condenser. After the reaction, there was obtained about 500 g of a colorless, transparent viscous liquid. By $C^{13}$—NMR, this liquid was found to be a polycarbonate diol containing pentamethylene groups and hexamethylene groups. All of the terminal groups of the diol were hydroxyl groups. By gas permeation chromatography (GPC), the molecular weight of the diol was measured and found to be about 1300.

EXAMPLE 8

500 Grams of a substantially colorless, transparent viscous liquid was prepared in substantially the same manner as in Example 7 except that the temperatures of the reaction during the dropping of dimethyl carbonate and the reaction under reduced pressure were respectively 170° to 185° C. and 180° to 200° C. and that the value of r was 0.947. By $C^{13}$—NMR, this liquid was found to be a polycarbonate diol containing pentamethylene groups and hexamethylene groups. All of the terminal groups of the diol were hydroxyl groups. By GPC, the molecular weight of the diol was found to be about 2200.

COMPARATIVE EXAMPLE 4

A copolycarbonate diol was prepared in substantially the same manner as in Example 5 except that 236 g (2.0 mol) of 1,6-hexanediol and 320 g (2.0 mol) of 1,9-nonanediol were used instead of 4.2 mol of 1,6-hexanediol, 4.2 mol of 1,5-pentanediol and 1.6 mol of 1,4-butanediol. The copolycarbonate was a white solid at room temperature. The DSC measurement of the copolycarbonate diol showed a peak of melting point at 28° C., indicating that the copolycarbonate diol was a crystalline polymer. By $C^{13}$—NMR, it was found that all of the terminal groups of the copolycarbonate diol were hydroxyl groups. The hydroxyl value of the copolycarbonate was 46.8 mgKOH/g.

EXAMPLE 9

500 Parts by weight of 1,6-hexanediol, 450 parts by weight of 1,5-pentanediol and 400 parts by weight of ethylene carbonate were charged in a two-liter four-necked round-bottomed flask equipped with a stirrer, a thermometer, a packed distillation column and a feed funnel. The mixture in the flask was heated under a pressure of about 120 mmHg to perform distillation while collecting a distillate at a temperature of about 145° C. Then, 700 parts by weight of ethylene carbonate was added dropwise to the reaction mixture through the feed funnel, and the temperature of the mixture was maintained at about 200° to 205° C. As a result, about 570 parts by weight of a distillate were obtained. Thereafter, the pressure was reduced to about 25 mmHg, and the unreacted materials were distilled off at an external temperature of about 200° to 250° C. As a result, about 250 parts by weight of a distillate was recovered. Subsequently, the external temperature was elevated to 220° C., and a final distillation was conducted under a pressure of 3 mmHg. Thus, about 103 parts by weight of a distillate was further recovered. The distillates had a hydroxyl value of 66.0, and had substantially no melting point.

Preparation of carboxyl group-terminated copolycarbonates

EXAMPLE 10

200 g of the copolycarbonate obtained in Example 1 (number average molecular weight: 2,331) and 19.1 g of succinic anhydride were charged in a reactor provided with a stirrer and a thermometer, and the air in the reactor was replaced with $N_2$. The resultant mixture was heated so as to allow the temperature to be gradually elevated to 130° C. while stirring, and then reacted for 2 hours. The resultant polymer was liquid, and when GPC analysis was conducted, no succinic acid remaining unreacted was detected. By $C^{13}$—NMR determination, it was confirmed that all of the terminals of the polymer were carboxyl groups, and that there were no hydroxyl groups remaining at the terminals. The polymer had a carboxylic acid equivalent of 1,275 as measured by neutralization titration.

Preparation of (meth)acryloyl group-terminated copolycarbonates

EXAMPLE 11 copolycarbonate acrylate 910 parts by weight of the copolycarbonate obtained in Example 7 (OH value: 86.3 mg KOH/g), 121 parts by weight of acrylic acid, 14 parts by weight of p-toluenesulfonic acid, 1.0 part by weight of hydroquinone, 560 parts by weight of benzene and 140 parts by weight of cyclohexane were charged in a 2 l-reactor provided with a stirrer, a temperature control unit, a thermometer and a condenser, and reaction was conducted at 80° to 86° C. Water generated and the solvent were distilled off and condensed. The condensed water was removed by a separator, and the condensed solvent was fed back to the reactor. This procedure was repeated until the total amount of generated water became 25.2 parts by weight, and then the reaction system was cooled down. The resultant reaction mixture was dissolved in a mixture of 960 parts by weight of benzene and 240 parts by weight of cyclohexane, and neutralized with a 20% aqueous caustic soda. Thereafter, the product was washed with 500 parts of a 20% saline solution three times. Subsequently, the solvent was removed by vacuum distillation, thereby obtaining 900 parts by weight of a slightly yellowish liquid product.

EXAMPLE 12 copolycarbonate methacrylate

Reaction was conducted in substantially the same manner as in Example 11 except that 910 parts by weight of the copolycarbonate (OH value: 86.3 mg KOH/g), 145 parts by weight of methacrylic acid, 4.5 parts by weight of sulfuric acid, 1.1 parts by weight of hydroquinone and 700 parts by weight of toluene were reacted, and that the reaction temperature was from 105° to 116° C. The resultant reaction mixture was dissolved in 1000 parts by weight of toluene, and then neutralization, washing, and removal of the solvent were conducted in substantially the same manner as in Example 11, thereby obtaining 933 parts by weight of a slightly yellowish liquid product.

EXAMPLE 13 copolycarbonate urethaneacrylate

1 Mole of the copolycarbonate obtained in Example 1 (OH value: 56.0 mg KOH/g), 2 moles of tolylene diisocyanate, 2 moles of ₂ hydroxyethyl acrylate and 200 ppm of dibutyltin laurate were charged in a four-necked flask having a capacity of 3 l and equipped with a stirrer, a refrigerator and a thermometer. The mixture was heated at 60° to 70° C. to advance a reaction. During the reaction, the decrease in amount of tolylene diisocyanate in the mixture was monitored by analysis of infrared spectrophotometry, and the reaction was terminated at the time when the absorption at the wave number of 2270 $cm^{-1}$ ascribed to the isocyanate group disappeared. Thus, there was obtained a polycarbonate urethaneacrylate.

EXAMPLE 14 copolycarbonate urethanemethacrylate

1 Mole of the copolycarbonate obtained in Example 1 (OH value: 56.0 mg KOH/g), 2 moles of hexamethylene diisocyanate and 20 ppm of dibutyltin laurate were charged in the same flask as used in Example 14. The mixture was heated at 80° C. for 3 hours to obtain a polyurethane having isocyanate groups at its terminals. To the thus obtained polyurethane was added 1 mole of 2-hydroxypropyl methacrylate. The mixture was heated at 80° C. for 3 hours so that the absorption at the wave number of 2270 $cm^{-1}$ ascribed to the isocyanate group disappeared. Thus, there was obtained a solution of copolycarbonate urethanemethacrylate in 2-hydroxypropyl methacrylate.

Preparation of allyl group-terminated copolycarbonate

EXAMPLE 15

180 g of the copolycarbonate obtained in Example 1, 360 g of toluene and 11.5 g of pyridine were mixed. The mixture was cooled to 10° C. Then, 40 g of allyl chloroformete was gradually added to the mixture while stirring. The resultant solution was heated to 25° C., and the pyridine hydrochloride formed in the solution wa filtered off. The resultant filtrate was washed with water several times and subjected to evaporation so that the solvent of the solution was distilled off. Thus, there was obtained an allyl group-terminated copolycarbonate.

EXAMPLE 16

47.2 g (0.4 mole) of 1,6-hexanediol, 20.8 g (0.2 mole) of 1,5-pentanediol, 18 g (0.2 mole) of 1,4-butanediol, 11 g (0.08 mole) of trimethylolpropane, 100 g (0.7 mole) of diallyl carbonate and 20 ml of a 30% sodium methoxide solution in methanol were charged in a reaction vessel equipped with a stirrer, a thermometer and a fractionating column. The mixture was heated at 120° C. and vigorously stirred under a pressure of 150 mmHg. Then, the reaction was advanced for 5 hours while removing allyl alcohol by evaporation. Then, to the reaction mixture was added 500 g (3.5 moles) of diallyl carbonate. The mixture was heated under the same conditions as mentioned above for 2 hours to form bisallylcarbonate. Then, the mixture was heated under a pressure of 2 mmHg for 25 hours while removing by-produced diallyl carbonate by evaporation to advance a chain extension of biallylcarbonate. During the chain extension, sampling of the mixture was conducted at intervals, and the viscosity and molecular weight of the obtained samples were determined. The thus obtained polymer was cooled and dissolved in dichloromethane and neutralized. Then, the resultant polymer solution was washed and dried. The solvent of the polymer solution was then removed by evaporation under reduced pressure to obtain a liquid bisallylcopolycarbonate. The number average molecular weight of the bisallylcopolycarbonate was 5500 in terms of the value as obtained by GPC method.

Preparation of alkyl carbonate group-terminated copolycarbonate

EXAMPLE 17

(1) Synthesis of bisalkylcarbonate 391 g (3.32 moles) of 1,6-hexanediol, 5976 g (66.4 moles) of dimethyl carbonate and 0.2 g (0.00067 mole) of dibutyltin methoxide were charged in an autoclave. The mixture was heated at 220° C. for 3 hours to advance a reaction. After completion of the reaction, the dimethyl carbonate was removed by evaporation under reduced pressure to obtain a 1,6-hexanediol bismethylcarbonate. The yield of 1,6-hexanediol bismethylcarbonate was 98.0%. A 1,5-pentanediol bismethylcarbonate was also obtained in substantially the same manner as mentioned above except that 1,5-pentane diol was used instead of 1,6-hexane diol.

(2) Polymerization of bisalkylcarbonate 200.1 g (0.86 mole) of 1,6-hexanediol bismethylcarbonate and 189.2 g (0.8 mole ) of 1,5-pentanediol bismethylcarbonate and further 2 g (0.008 mole) of dibutyltin oxide were charged in a reaction vessel equipped with a stirrer, a thermometer and a fractionating column. Condensation polymerization was performed under argon atmosphere at 220° C. while removing dimethyl carbonate over a period of 5 hours during which the pressure, which was 1 atm at the initial stage, was gradually decreased toward 5 mmHg at the final stage. The thus obtained polymer was found to be a bismethylcopolycarbonate which was transparent and amorphous. The molecular weight of the bismethylcopolycarbonat was 16,000 as measured by GPC.

Preparation of substituted silyl group-terminated copolycarbonate which is reactive at room temperature

EXAMPLE 18

100 g of the allyl group-terminated copolycarbonate obtained in Example 15 was mixed with 28 g of methylhydrogendiacetoxysilane and 0.01 g of chloroplatinic acid and the mixture was heated at 120° C. for 4 hours to advance a reaction. Then, low boiling point products in the reaction mixture were removed under reduced pressure, thereby obtaining a polymer represented by the following formula:

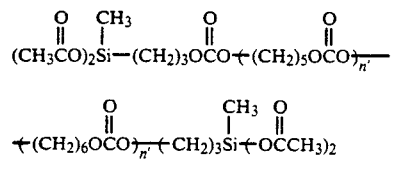

wherein n' has an average value of 6.3.

10 g of the thus obtained polymer was well mixed with 0.1 g of dibutyltin dilaurate and active zinc oxide. Then, the resultant mixture was allowed to stand at room temperature in contact with the atmosphere. Two days later, a crosslinked polymer was obtained.

EXAMPLE 19

Substantially the same procedure as in Example 18 was repeated except that methylhydrogenmethoxysilane was used instead of methylhydrogendiacetoxysilane, to obtain a polymer represented by the following formula:

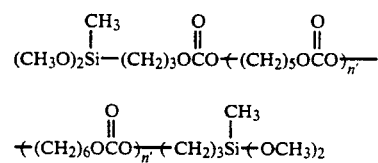

wherein n' has an average value of 6.3.

10 g of the thus obtained polymer was well mixed with 0.1 g of dibutyltin dilaurate and active zinc oxide. Then, the resultant mixture was allowed to stand at room temperature in contact with the atmosphere. Two days later, a crosslinked polymer was obtained.

Preparation of polyurethane from hydroxyl group-terminated copolycarbonate

REFERENCE EXAMPLES 1 TO 7

Substantially the same procedures as in Example 1 were repeated, except that 1,6-hexanediol and 1,5-pentanediol were used in the amounts indicated in Table 2, to prepare aliphatic copolycarbonate diols. The thus prepared copolycarbonate diols were designated PC-A to PC-G, respectively, as shown in Table 2. The hydroxyl values of PC-A to PC-G are shown in Table 2.

TABLE 2

| Reference Example No. | Amount of 1,6-HD[1] (g) | (Mole) | Amount of 1,5-PD[2] (g) | (Mole) | Hydroxyl value | Designation |
|---|---|---|---|---|---|---|
| 1 | 472 | (4.0) | 416 | (4.0) | 56.0 | PC-A |
| 2 | 755 | (6.4) | 166 | (1.6) | 55.4 | PC-B |
| 3 | 283 | (2.4) | 583 | (5.6) | 57.1 | PC-C |
| 4 | 944 | (8.0) | 0 |  | 56.1 | PC-D |
| 5 | 896.8 | (7.6) | 41.6 | (0.4) | 55.0 | PC-E |
| 6 | 0 |  | 832 | (8.04) | 57.0 | PC-F |
| 7 | 47.2 | (0.4) | 790 | (7.6) | 56.3 | PC-G |

Note:
[1] 1,6-hexanediol
[2] 1,5-pentanediol

REFERENCE EXAMPLE 8

Substantially the same procedure as in Reference Example 1 was repeated, except that 440 g of diethyl carbonate was used, to prepare a copolycarbonate diol. The thus prepared copolycarbonate diol was designated PC-H. The hydroxyl value of PC-H was 75.0.

REFERENCE EXAMPLE 9

Substantially the same procedure as in Reference Example 1 was repeated except that 490 g of diethyl carbonate was used, to prepare a copolycarbonate diol. The thus prepared polycarbonate diol was designated PC-I. The hydroxyl value of PC-I was 38.0.

REFERENCE EXAMPLE 10

Substantially the same procedure as in Example 5 was repeated except that 496 g (4.3 moles) of 1,6-hexanediol, 437 g (4.3 moles) of 1,5-pentanediol and 144 g (1.4 moles) of 1,4-butanediol were used, to prepare a copolycarbonate diol. The thus prepared copolycarbonate diol was designated PC-J. The hydroxyl value of PC-J was 53.3.

REFERENCE EXAMPLE 11

Substantially the same procedure as in Comparative Example 4 was repeated except that 236 g (2.0 moles) of 1,6-hexanediol and 320 g (2.0 moles) of 1,9-nonanediol were used, to prepare a copolycarbonate diol. The thus prepared copolycarbonate was designated PC-K. The hydroxyl value of PC-K was 46.8.

REFERENCE EXAMPLE 12

Substantially the same procedure as in Comparative Example 3 was repeated except that 472 g (4.0 moles) of 1,6-hexanediol and 360 g (4.0 moles) of 1,4-butanediol were used, to prepare a copolycarbonate diol. The thus prepared copolycarbonate diol was designated PC-L. The hydroxyl value of PC-L was 58.1.

EXAMPLES 20 TO 26 AND COMPARATIVE EXAMPLES 5 TO 12

In Examples and Comparative Examples, using a polyol, a diisocyanate and a chain extender as indicated in Table 3 in the amounts indicated in Table 3, polyurethanes were separately prepared as follows. A polyol was sufficiently dehydrated under reduced pressure and dissolved in a 4-fold amount by weight of a mixed solvent consisting of toluene and methyl isobutyl ketone in a weight ratio of 1:1. The resultant solution was heated to 100° C. Separately, a diisocyanate was dissolved in an equal amount by weight of the above-mentioned solvent. The resultant solution was mixed with the above-obtained solution containing the polyol dissolved therein. To the resultant mixture was added a solution of dibutyltin laurate in the above mentioned solvent at a concentration of 10% by weight, so that the final concentration of dibutyltin laurate in the resultant mixture became 100 ppm based on the total weight of solid substances. The resultant mixture was heated at 100° C. for 1 hour to form a prepolymer.

Separately, a predetermined amount of a chain extender as indicated in Table 3 was dissolved in the above-mentioned solvent in such an amount that when the resultant solution was added to the above-obtained mixture containing a prepolymer, the solid substance content of the resultant mixture became 25% by weight. The resultant solution was added to the above-obtained mixture containing a prepolymer and heated at 100° C. for 1 hour, while stirring vigorously, to obtain a 25% by weight polyurethane solution. From the polyurethane solution, the solvent was distilled off under reduced pressure, to obtain a polyurethane.

With respect to each of the thus obtained polyurethanes, an intrinsic viscosity is determined from the ratio of the specific viscosity of a solution of the polyurethane in dimethylacetamide to the polyurethane concentration of the solution through extrapolation to zero concentration. As a result, it was found that all of the polyurethanes obtained in the above-mentioned Examples and Comparative Examples had an intrinsic viscosity of from 0.8 to 1.2.

Further, the properties of each polyurethane were determined according to the following test methods.

RESISTANCE TO HYDROLYSIS

Using each polyurethane, a 100 μm-thick film was prepared and treated with boiling water at 100° C. for 12 hours. Then, the treated film was subjected to determination of number average molecular weight by the GPC method as mentioned before. The resistance to hydrolysis was evaluated in terms of the ratio (%) of the number average molecular weight of the treated film to that of the polyurethane before treatment.

RESISTANCE TO LIGHT

A 100 μm-thick film of each polyurethane was irradiated with an ultraviolet light of a wavelength of 380 nm emitted from a carbon arc lamp using a fade-o-meter for 25 hours. Then, the irradiated film was subjected to determination of tensile strength at break. The resistance to light was evaluated in terms of the ratio (%) of tensile strength at break of the irradiated film to that of the nonirradiated film.

RESISTANCE TO OXIDATIVE DEGRADATION

Each polyurethane was subjected to thermogravimetric analysis (TGA) in air. The temperature was elevated at a rate of 10° C./min, to determine the temperature at which the thermal decomposition is initiated. The resistance to oxidative degradation was evaluated in terms of the temperature at which thermal decomposition starts, that is, the higher the temperature, the more the resistance to oxidative degradation.

ELASTIC RECOVERY

The same 100 μm-thick film as obtained above was gradually stretched over 90 seconds so that the length of the film was increased 3 times. The film was held for 90 seconds in the stretched state. Then, the stretching load was removed and the length of the resultant film was measured. The elastic recovery (%) was calculated by the formula:

$$\frac{A - B}{B} \times 100 \, (\%)$$

wherein A is the length of the film after stretching, and B is the length of the film before stretching.

RESISTANCE TO CHLORINE

The same 100 μm-thick film as obtained above was treated with an aqueous solution (pH 7.0) containing 1773 ppm of sodium hypochlorite at 70° C. for 16 hours. Then, the treated film was subjected to determination of tensile strength at break. The resistance to chlorine was evaluated in terms of the ratio (%) of tensile strength at break of the treated film to that of the film not treated.

The results are shown in Table 3.

TABLE 3

| | Ingredients | | | Properties | | | |
|---|---|---|---|---|---|---|---|
| | Polyol (mole) | Diisocyanate (mole) | Chain extender (mole) | Resistance to hydrolysis (%) | Resistance to light (%) | Resistance to oxidative degradation (°C.) | Elastic recovery (%) |
| Example 20 | PC-A (2.0) | HDI[3)] (3.0) | 1,4-B.D.[6)] (1.0) | 100 | 100 | 240 | 65 |
| Example 21 | PC-B (2.0) | HDI (3.0) | 1,4-B.D. (1.0) | 100 | 100 | 235 | 70 |
| Example 22 | PC-C (2.0) | HDI (3.0) | 1,4-B.D. (1.0) | 100 | 100 | 240 | 69 |
| Example 23 | PC-H (1.0) | HDI (2.0) | 1,4-B.D. (1.0) | 100 | 100 | 245 | 60 |
| Example 24 | PC-H (1.0) | HDI (3.0) | 1,4-B.D. (2.0) | 100 | 100 | 245 | 60 |
| Example 25 | PC-A (1.0) | H-MDI[4)] (2.0) | EG[7)] (1.0) | 100 | 100 | 245 | 75 |
| Example 26 | PC-A (1.0) | MDI[5)] (3.0) | 1,4-B.D. (2.0) | 100 | 85 | 260 | 42 |
| Comparative Example 5 | PC-D (2.0) | HDI (3.0) | 1,4-B.D. (1.0) | 100 | 100 | 235 | 135 |
| Comparative Example 6 | PC-E (2.0) | HDI (3.0) | 1,4-B.D. (1.0) | 100 | 100 | 235 | 130 |
| Comparative Example 7 | PC-F (2.0) | HDI (3.0) | 1,4-B.D. (1.0) | 100 | 100 | 235 | 140 |
| Comparative Example 8 | PC-G (2.0) | HDI (3.0) | 1,4-B.D. (1.0) | 100 | 100 | 237 | 135 |
| Comparative Example 9 | PTMG[1)] (2.0) | HDI (3.0) | 1,4-B.D. (1.0) | 45 | 5 | 190 | 110 |
| Comparative Example 10 | PTA[2)] (2.0) | HDI (3.0) | 1,4-B.D. (1.0) | 25 | 85 | 235 | 180 |
| Comparative Example 11 | PC-K (2.0) | HDI (3.0) | 1,4-B.D. (1.0) | 100 | 100 | 240 | 115 |
| Comparative Example 12 | PTMG (1.0) | MDI (3.0) | 1,4-B.D. (2.0) | 40 | 5 | 210 | 69 |

Note:
[1)]polytetramethylene glycol (OH value: 59.6) (manufactured and sold by Asahi Kasei Kogyo Kabushiki Kaisha, Japan)
[2)]polytetramethylene adipate (OH value: 58.3) (manufactured and sold by Dainippon Ink & Chemicals, Inc., Japan)
[3)]hexamethylene diisocyanate
[4)]4,4'-methylene-bis(cyclohexyl)diisocyanate
[5)]diphenylmethane-4,4'-diisocyanate
[6)]1,4-butanediol
[7)]ethylene glycol

EXAMPLE 27 AND 28 AND COMPARATIVE EXAMPLES 13 TO 16

2 Moles of PC-A were mixed with 4 moles of diphenylmethane-4,4'-diisocyanate and heated at 80° C. for 4 hours while stirring in a stream of nitrogen, to prepare an isocyanate-terminated prepolymer. The thus prepared prepolymer was cooled to room temperature and dissolved in sufficiently dehydrated dimethylacetamide in such a amount that the prepolymer concentration became 35% by weight. To the resultant solution a dimethylacetamide solution, containing 2 moles of ethylenediamine dissolved therein, was added all at once in such an amount that the resultant polyurethane concentration became 30% by weight. The mixture was stirred at room temperature for 30 min.

Part of the thus obtained polyurethane solution was cast to prepare a 100 μm-thick film. The film was examined with respect to the resistance to hydrolysis, resistance to light, resistance to oxidative degradation, elastic recovery and resistance to chlorine in the same manner as mentioned before. Further, the film was also examined with respect to tensile stress and tensile elongation according to the method defined in JIS K-6301.

The results ar shown in Table 4 and the FIGURE of the accompanying drawing.

The remaining most part of the polyurethane was subjected to spinning using a spinning machine in order to prepare a polyurethane fiber. The results are also shown in Table 4.

Substantially the same procedure as mentioned above was repeated, except that the polycarbonate diols indicated in Table 4 were separately used instead of PC-A, to obtain polyurethanes and determine the properties of the obtained polyurethanes. The results are also shown in Table 4.

As apparent from the results in Examples 20 to 28 and Comparative Examples 5 to 16, the polyurethanes of the present invention were excellent in all of resistance to hydrolysis, resistance to light, resistance to oxidative degradation, elastic recovery and resistance to chlorine, as different from the polyurethanes of Comparative Examples, and it can be concluded that the polyurethane of the present invention has excellent chemical stability and excellent elasticity as compared with conventional polyurethanes.

Further, as apparent from the FIGURE, the polyurethanes of the present invention have excellent elastomeric properties. In this connection, it is noted that the polyurethanes of Comparative Examples 15 and 16 also have elastomeric properties comparable to those of the polyurethanes of the present invention. However, as shown in Table 4, the polyurethanes of Comparative Examples 15 and 16 are poor in resistance to hydrolysis, light and chlorine, differing from the polyurethanes of the present invention which are excellent in not only resistance to hydrolysis, light and chlorine, but also resistance to oxidative degradation and elastomeric recovery.

TABLE 4

| | Polycarbonate diol used | Resistance to hydrolysis (%) | Resistance to light (%) | Resistance to oxidative degradation (°C.) | Elastic recovery (%) | Resistance to chlorine (%) | Spinnability |
|---|---|---|---|---|---|---|---|
| Example 27 | PC-A | 100 | 92 | 295 | 16 | 20 | Excellent (fiber can be produced) |
| Example 28 | PC-J | 100 | 85 | 295 | 17 | 18 | Excellent (fiber can be produced) |
| Comparative Example 13 | PC-D | 100 | 90 | 295 | 28 | 18 | poor (fiber cannot be produced) |
| Comparative Example 14 | PC-L | 100 | 70 | 285 | 23 | 15 | poor (fiber cannot be produced) |
| Comparative Example 15 | PTMG[1] | 89 | 0 | 268 | 13 | 0 | Excellent (fiber can be produced) |
| Comparative Example 16 | PHNA[2] | 45 | 21 | 290 | 18 | 0 | Excellent (fiber can be produced) |

Note:
[1] it has the same meaning as defined in item [1] of the footnote for Table 3
[2] polyhexamethylene neopentylene adipate (manufactured and sold by Bayer Aktiengesellschaft, West Germany; hydroxyl value: 56.0)

Preparation Polyamide-copolycarbonate block copolymer obtained from carboxyl group-terminated copolycarbonate an evaluation

EXAMPLE 29

(1) Synthesis of a polyamide-copolycarbonate block copolymer

A copolycarbonate having carboxyl groups at both of its terminals was prepared in substantially the same manner as in Example 10.

In a reactor provided with a stirrer and a thermometer, 40 g of the above-mentioned copolycarbonate, 8.7 g of adipic acid and 230 g of sulfolane together with 0.16 g of 1-phenyl-3-methyl-2-phosphorene-1-oxide, as a catalyst, were charged. The resultant mixture was heated up to 165° C. under a nitrogen atmosphere. Then, 19.2 g of diphenylmethane-4,4'-diisocyanate was gradually added to the mixture while stirring, and reacted for 3 hours. The resultant polymer solution was poured into a large amount of water, thereby causing the polymer to be coagulated. The coagulated polymer was filtered off, and the polymer was washed with methanol under reflux. The washed polymer was dried in vacuo. The resultant polymer had a weight average molecular weight of 60,000 as measured by gel permeation chromatography using standard polystyrene. The weight ratio of the block of formula (X) to the block of formula (XI) was about 70/30 as calculated from the ratio of the charged feedstocks.

(2) Evaluation of the polyamide-copolycarbonate block copolymer

The above-obtained polymer was subjected to press molding at 210° C., thereby obtaining a sheet having a thickness of 2 mm. The sheet had rubber-like elasticity. The hardness of the sheet was measured in accordance with Japanese Industrial Standards (JIS) K6301. As a result, the hardness of the sheet was found to be 90. The sheet was subjected to the measurement of dynamic viscoelasticity. As a result, it was found that the storage elastic modulus had an inflection point at 195° C., at which the modulus decreased sharply. This indicates that the sheet had high resistance to heat.

A dumbbell specimen has blanked off from this sheet. With respect to the specimen, the maintenance (%) of tensile strength after exposure to a carbon-arc lamp at 63° C. for 15 hours was determined using a fade-o-meter. As a result, it was found that the maintenance was 99%, that is, the deterioration of the physical properties due to exposure to light was very little.

A sample from this sheet was immersed in hot water at 100° C. for 15 hours, and then the weight average molecular weight of the sample was measured using GPC. It was found that the sample had a weight average molecular weight of 59,000. That is, the decrease in molecular weight of the polymer by the press and hot-water treatment was very little.

Preparation of polyester-copolycarbonate block copolymer from hydroxyl group-terminated copolycarbonate and evaluation

EXAMPLE 30

(1) Synthesis of copolycarbonate diol 268 g of 1,6-hexanediol and 179 g of 1,5-pentanediol were charged in a reactor provided with a stirrer, a thermometer and a fractionating column, and the resultant mixture was heated to 70° C. Then, 0.92 g of metallic sodium was added to the mixture while stirring. After the metallic sodium was dissolved, 236 g of diethyl carbonate was added to the resultant mixture. As the reaction temperature was elevated to 95° to 100° C., ethanol began to be distilled off. The reaction temperature was gradually elevated to 160° C. in about 6 hours. During that period, ethanol containing a small quantity of diethyl carbonate was distilled off. After that period, the pressure in the reactor was reduced to 10 mmHg or less, and the reaction was performed at 200° C. for 4 hours while vigorously agitating and distilling of ethanol. The resultant polymer was cooled, and dissolved in dichloromethane, followed by neutralization with a dilute acid. Then, the polymer was washed with water several times, and subjected to dehydration with sodium sulfate anhydride. The solvent was removed by distillation, followed by drying at 140° C. under a pressure of 2 to 3 mmHg for several hours. The resultant copolycarbonate diol was a liquid polymer having a number average molecular weight of 2100 as calculated from the hydroxyl value. By $C^{13}$—NMR determination, it was found that the copolycarbonatediol comprised 1,6-hexanediol residues and 1,5-pentanediol residues in a weight ratio of about 60:40.

(2) Synthesis of a polyester-copolycarbonate copolymer 90 g of the above-obtained copolycarbonate diol, 16.7 g of 1,4-butanediol, 100 g of o-dichlorobenzene and 200 ml of benzene were charged in a reactor provided with a stirrer, a thermometer and a fractionating column. The temperature of the resultant mixture was elevated to 180° C. under a stream of $N_2$, thereby distilling off most of the benzene. The water in the reaction mixture was removed by azeotropic distillation, and the reaction mixture was cooled down to room temperature. Thereafter, 830 g of a 56% o-dichlorobenzene solution of terephthaloyl chloride, 0.5 g 1,4-butanediol and 0.09 g of titanium tetrabutoxide were added, to the reaction mixture, and the resultant mixture was heated to 180° C. and reacted for 4 hours. The resultant reaction mixture was poured into methanol to deposit the polymer. The thus deposited polymer was washed with methanol, followed by vacuum drying. The thus obtained polymer had a number average molecular weight of 85,000. The weight ratio of recurring units represented by formula (XV) to recurring units represented by formula (XVI) was about 70:30 as calculated from the ratio of the charged feedstocks.

(3) Evaluation of the polyester-copolycarbonate block copolymer

The above-obtained polymer was subject to press molding, thereby obtaining a sheet having a thickness of 2 mm. The sheet had rubber-like elasticity. With respect to the sheet, the hardness, oil resistance, light resistance and elastic recovery were measured. The results are shown in Table 5.

The above measurements were conducted according to the following methods.

| Hardness: | Measurement of hardness was conducted in accordance with Japanese Industrial Standard (JIS) K 6031. |
| Oil resistance: | A test piece was immersed in JIS No. 3 oil at 70° C. for 2 hours. The increase in weight of the test piece due to the immersion was measured. |
| Light resistance: | The maintenance (%) of the number average molecular weight of a test piece after exposure to a carbon-arc lamp at 63° C. for 15 hours was determined using a fade-o-meter. |
| Elastic recovery: | A JIS No. 3 type dumbbell specimen was blanked off from a sheet. The specimen was elongated by 200% at a speed of 500 mm/min and then allowed to shrink at the same speed. In this instance, the tensile stress at 100% elongation was measured both in the course of stretch, S ($kgf/cm^2$) and in the course of return, R ($kgf/cm^2$). Elastic recovery was determined by the following equation. |

$$\text{Elastic recovery (\%)} = \frac{R}{S} \times 100$$

A sample sheet was immersed in hot water at 100° C. for 15 hours, and then the weight average molecular weight of the sheet was measured using GPC. It was found that the sheet had a weight average molecular weight of 84,000. That is, the decrease in molecular weight of the polymer by the press treatment and the hot-water treatment was little.

EXAMPLE 31

Copolycarbonate diol was synthesized in substantially the same manner as in Example 30 except that 174 g 1,6-hexanediol and 262 g of 1,5-pentanediol were employed. The thus obtained copolycarbonatediol was a liquid polymer having a number average molecular weight of 2150 as calculated from the hydroxyl value. By $C^{13}$—NMR determination, it was found that the copolycarbonatediol comprised 1,6-hexanediol residues and 1,5-pentanediol residues in a weight ratio of about 40:60.

A polyester-polycarbonate block copolymer was prepared in substantially the same manner as in Example 30 except that 92 g of the above-obtained copolycarbonate diol was employed. The resultant polymer had a weight average molecular weight of 83,000. The weight ratio of recurring units represented b formula (XV) to recurring units represented by formula (XVI) was about 70:30 as calculated from the ratio of the charged feedstocks.

The polymer was evaluated with respect to the physical properties in substantially the same manner as in Example 30. The results are shown in Table 5.

EXAMPLE 32

Copolycarbonate diol was synthesized in substantially the same manner as in Example 30 except that 221 g of 1,6-hexanediol and 221 g 1,5-pentanediol were employed. The thus obtained copolycarbonate diol was a liquid polymer having a number average molecular weight of 2060 as calculated from the hydroxyl value. By $C^{13}$—NMR determination, it was found that the copolycarbonate diol comprised 1,6-hexanediol residues and 1,5-pentanediol residues in a weight ratio of about 50:50.

A polyester-copolycarbonate block copolymer was prepared in substantially the same manner as in Example 30 except that 36 g of the above-obtained copolycarbonate diol and 19.0 g of 1,4-butanediol were employed. The resultant polymer had a weight average molecular weight of 90000. The weight ratio of recurring units represented by formula (XV) to recurring units represented by formula (XVI) was about 45:55 as calculated from the ratio of the charged feedstocks.

The polymer was evaluated with respect to the physical properties in the same manner as in Example 30. The results are shown in Table 5.

EXAMPLE 33

Copolycarbonate diol was synthesized in substantially the same manner as in Example 30 except that 204 g 1,6-hexanediol, 228 g of 1,5-pentanediol and 70 g of 1,4-butanediol were employed. The thus obtained copolycarbonate diol was a liquid polymer having a number average molecular weight of 2200 as calculated from the hydroxyl value. By $C^{13}$—NMR determination, it was found that the copolycarbonate diol comprised 1,6-hexanediol residues, 1,5-pentanediol residues and 1,4-butanediol residues in a weight ratio of 41:45:14.

A polyester-copolycarbonate block copolymer was prepared in substantially the same manner as in Example 30 except that 36 g of the above-obtained copolycarbonate diol was employed. The resultant polymer had a weight average molecular weight of 82,000. The weight ratio of recurring units represented by formula (XV) to recurring units represented by formula (XVI) was about 45:55 as calculated from the ratio of the charged feedstocks.

The polymer was evaluated with respect to the physical properties in substantially the same manner as in Example 30. The results are shown in Table 5.

COMPARATIVE EXAMPLES 17 AND 18

Substantially the same procedure for preparing a block copolymer as described in Example 30 was repeated, except that 85.6 g of a polytetramethylene glycol having a number average molecular weight of 1750 was employed in place of the copolycarbonate diol, thereby obtaining a polyester-polyether block copolymer having a weight average molecular weight of 90,000 (Comparative Example 17).

Separately, substantially the same procedure for preparing a copolymer as described in Example 30 was repeated, except that 35 g of the polytetramethylene glycol as mentioned above was employed in place of the copolycarbonate diol, thereby obtaining a polyester-polyether block copolymer having a weight average molecular weight of 88,000 (Comparative Example 18)

With respect to the above-obtained copolymers, the physical properties were measured in substantially the same manner as in Example 30. The results are shown in Table 5.

COMPARATIVE EXAMPLE 19

Substantially the same procedure for preparing a copolymer as described in Example 30 was repeated, except that 88.5 g of a polycarbonate diol comprised mainly of 1,6-hexanediol residues and having a number average molecular weight of 1970 (D-2000 manufactured and sold by TOAGOSEI CHEMICAL INDUSTRY CO., LTD, JAPAN) was employed, thereby obtaining a polyester-polycarbonate block copolymer. The obtained copolymer had a weight average molecular weight of 85,000. The weight ratio of recurring units represented by formula (XV) to recurring units represented by formula (XVI) was about 70:30 as calculated from the ratio of the charged feedstocks.

With respect to the above-obtained copolymer, the physical properties were measured in substantially the same manner as in Example 30. The results are shown in Table 5.

TABLE 5

| | Polymer diol[1] Proportions of components (wt) | Formula[2] (XV)/ formula (XVI) [wt/wt] | Shore hardness (JISA) | Oil resistance (%) | Light resistance (%) | Elastic recovery (%) |
|---|---|---|---|---|---|---|
| Example No. 30 | Polycarbonate diol 1,6-HD/1,5-PD = 60/40 | 70/30 | 81 | 1.9 | 98 | 41 |
| Example No. 31 | Polycarbonate diol 1,6-HD/1,5-PD = 40/60 | 70/30 | 82 | 1.8 | 98 | 45 |
| Example No. 32 | Polycarbonate diol 1,6-HD/1,5-PD = 50/50 | 45/55 | 97 | 1.0 | 100 | 28 |
| Example No. 33 | Polycarbonate diol 1,6-HD/1,5-PD/1,4-BD = 4/45/14 | 45/55 | 98 | 0.9 | 99 | 23 |
| Comparative Example No. 17 | Polytetramethylene glycol | 70/30 | 83 | 8.0 | 14 | 44 |
| Comparative Example No. 18 | Polytetramethylene glycol | 45/55 | 97 | 2.1 | 40 | 26 |
| Comparative Example No. 19 | Polycarbonate diol D-2000 | 70/30 | 82 | 1.9 | 98 | 29 |

Note
[1] 1,6-HD: 1,6-hexanediol 1,5-PD: 1,5-pentanediol 1,4-BD: 1,4-butanediol
[2] Ratio of the recurring units represented by the formula (XV) to those represented by the formula (XVI)

From Table 5, it is apparent that the block copolymer of Comparative Example 19, in which a polycarbonate diol comprised mainly of 1,6-hexanediol residues is employed, has an oil resistance and a light resistance which are comparable to the copolymers of Examples 30 and 31, but it is markedly low in elastic recovery as compared to the copolymers of Examples 30 and 31. On the other hand, the copolymer of Comparative Example 17 has a Shore hardness and an elastic recovery which are comparable to those of Examples 30 to 31, but it exhibits very poor oil resistance and light resistance as compared to those of the copolymers of Examples 30 and 31.

EXAMPLE 34

(1) Preparation of a prepolymer solution

In a reactor provided with a stirrer, a thermometer, an inlet pipe for $N_2$ and a reflux condenser, 39.4 g of the polycarbonate diol obtained in Example 30, 30 g of terephthaloyl chloride, 30 g of isophthaloyl chloride, 300 ml of o-dichlorobenzene and 0.015 g of titanium tetrabutoxide were charged, and the resultant mixture was heated up to the reflux temperature while slowly blowing $N_2$ thereinto. Reaction was performed at the reflux temperature for 3 hours. Then, the reaction mixture was cooled down to room temperature, thereby obtaining a prepolymer solution.

(2) Preparation of a polyarylate-polycarbonate block copolymer 12.5 g of bis-(4-hydroxy-3,5-dimethylphenyl)sulfone, 3.4 g of sodium hydroxide and 0.6 g of sodium thiosulfate were dissolved in 730 ml of water under a stream of $N_2$, and the temperature of the resultant solution was adjusted to 5° C.

Separately, 190 ml of methylene chloride, 3.2 g of terephthaloyl chloride and 3.2 g of isophthaloyl chloride were dissolved in the above-obtained prepolymer solution. The resultant solution, together with 0.2 g of an 80% aqueous trioctyl-methylammonium chloride solution, was quickly added to the above separately prepared solution. The resultant mixture was reacted at 5° to 15° C. for 1 hour while vigorously stirring. Then, 16 ml of acetic acid were added, followed by further stirring for 15 min. Thereafter, the organic phase of the resultant reaction mixture was washed with water several times, and poured into an excess amount of acetone, thereby causing a polymer to be deposited. The thus obtained polymer, after vacuum drying, had a weight average molecular weight of 10,000. The weight ratio of recurring units represented by formula (XX) to recurring units represented by formula (XXI) was about 30:70 as calculated from the ratio of the charged feedstocks.

(3) Evaluation of the polyarylate-polycarbonate block copolymer

The above-obtained polymer was subjected to press molding, thereby obtaining a sheet having a thickness of 2 mm. The sheet had a rubber-like elasticity and a hardness (JIS-A) of 86 as measured in accordance with JSK-K 6301. A dumbbell specimen was blanked off from the sheet. With respect to the dumbbell specimen, the tensile strength was measured before and after exposure to a carbon arc lamp in a fade-o-meter at 63° C. for 15 hours, thereby determining the maintenance (%) of the tensile strength. As a result, the maintenance was found to be 99%, that is, substantially no lowering of the tensile strength was observed.

Further, the sheet was cut into a 2 cm×2 cm size and immersed in JIS No. 3 oil at 70° C. for 2 hours, thereby determining the weight increase by the immersion. As a result, it was found that the weight increase was 1.5%, which means that oil resistance was good.

EXAMPLE 35

Using a prepolymer solution prepared in substantially the same manner as in Example 34, a polyarylate-polycarbonate block copolymer was synthesized in substantially the same manner as in Example 34, except that 26.8 g of bisphenol A was employed in place of bis-(4-hydroxy-3,5-dimethylphenyl)-sulfone and that 10 g of sodium hydroxide, 1.3 g of sodium thiosulfate, 1 l of water, 380 ml of methylene chloride, 10.9 g of terephthaloyl chloride, 10.9 g of isophthaloyl chloride, 0.4 g of an 80% aqueous trioctylmethylammonium chloride and 44 ml of acetic acid were employed.

The resultant polymer had a weight average molecular weight of 90,000. The weight ratio of recurring units represented by formula (XX) to recurring units represented by formula (XXI) was about 50:50 a calculated from the ratio of the charged feedstocks.

The polymer was subjected to press molding, thereby obtaining a sheet. The sheet had a rubber-like elasticity. With respect to the sheet, the hardness, light resistance and oil resistance were evaluated in substantially the same manner as in Example 34. As a result, it was found that the sheet had a hardness (JIS-A) of 97 and a maintenance of tensile strength of 99%, showing good light resistance, and that the weight increase of the sheet by immersion in JIS No. 3 oil was 0.5%, showing excellent oil resistance.

What is claimed is:

1. A diol chain-extended thermoplastic polyurethane comprising:
   (a) a polyisocyanate component; and
   (b) a polyol component which is a copolycarbonate comprising recurring units respectively of the formulae:

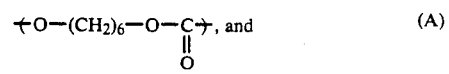 (A)

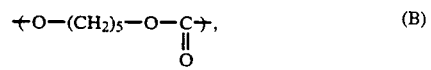 (B)

and terminal hydroxyl groups, the molar ratio of units (A) to units (B) being in the range of from 9:1 to 1:9, the copolycarbonate having a number average molecular weight of from 300 to 50,000.

2. A thermoplastic polyurethane which is at least substantially the same as that produced by reacting a hydroxyl group-terminated copolycarbonate represented by the formula:

 (I)

wherein each $R^1$ in the majority of the recurring units is independently an aliphatic glycol residue selected from 1,5-pentanediol and 1,6-hexanediol residues, both of which are concurrently present, and n is a number having an average value of from 2 to 200,
with a diisocyanate, wherein the reaction is conducted using a diol as a chain extender.

3. A thermoplastic polyurethane according to claim 2, wherein said dissocyanate is at least one member selected from the group consisting of 2,4-toylyene diisocyanate, 2,6-toylene diisocyanate, a crude mixture of 2,4- and 2,6-tolylene diisocyanates, diphenylmethane-4,4'-diisocyanate, naphthalene-1,5-diisocyanate, 3,3'-dimethyl-4,4'-biphenylene diisocyanate, polymethylene polyphenyl isocyanurate, crude diphenylmethane-4,4'-diisocyanate, xylylene diisocyanate, phenylene diisocyanate, 4,4'-methylene-biscyclohexyl diisocyanate, hexamethylene diisocyanate, isophorone diisocyanate and cyclohexane diisocyanate, and modified product thereof.

4. A thermoplastic polyurethane according to claim 2, wherein said diol is 1,4-butanediol, ethylene glycol or a mixture thereof.

5. A thermoplastic polyurethane according to claim 2, where said n is a number having an average value of from 4 to 100.

6. A thermoplastic polyurethane according to claim 2, wherein the molar ratio of the 1,5-pentanediol residue to the 1,6-hexanediol residue is 9/1 to 1/9.

7. A thermoplastic polyurethane according to claim 2, wherein the molar ratio of the terminal hydroxyl groups of said copolycarbonate to said diol is 2/1 to 1/2.

* * * * *

UNITED STATES PATENT AND TRADEMARK OFFICE
CERTIFICATE OF CORRECTION

PATENT NO. : 5,070,173

DATED : December 3, 1991

INVENTOR(S) : YOKOTA et al.

It is certified that error appears in the above-identified patent and that said Letters Patent is hereby corrected as shown below:

Column 14, line 60, "atom t the" should read --atom to the--.
Column 42, line 40, "dissocyanate" should read --diisocyanate--; line 41, "2,4-toylyene" should read --2,4-tolylene--; line 42, "2,6-toylene" should read --2,6-tolylene--; line 50, "modified product" should read --modified products--; line 57, "where" should read --wherein--.

Signed and Sealed this

Twentieth Day of April, 1993

Attest:

MICHAEL K. KIRK

*Attesting Officer*  *Acting Commissioner of Patents and Trademarks*